United States Patent
Phillips et al.

(10) Patent No.: US 7,099,443 B2
(45) Date of Patent: Aug. 29, 2006

(54) FIBER OPTIC INTERNET PROTOCOL NETWORK INTERFACE DEVICE AND METHODS AND SYSTEMS FOR USING THE SAME

(75) Inventors: Bruce A. Phillips, Erie, CO (US); Steven M. Casey, Littleton, CO (US); Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 275 days.

(21) Appl. No.: 10/715,879

(22) Filed: Nov. 17, 2003

(65) Prior Publication Data

US 2004/0163128 A1  Aug. 19, 2004

Related U.S. Application Data

(63) Continuation-in-part of application No. 10/377,280, filed on Feb. 27, 2003, and a continuation-in-part of application No. 10/367,597, filed on Feb. 14, 2003, and a continuation-in-part of application No. 10/367,596, filed on Feb. 14, 2003, and a continuation-in-part of application No. 10/356,338, filed on Jan. 31, 2003, and a continuation-in-part of application No. 10/356,688, filed on Jan. 31, 2003, and a continuation-in-part of application No. 10/356,364, filed on Jan. 31, 2003.

(51) Int. Cl.
*H04M 11/00* (2006.01)

(52) U.S. Cl. .................................. 379/93.05; 379/90.01

(58) Field of Classification Search .. 379/93.05–93.07, 379/90.01; 370/466–467
See application file for complete search history.

(56) References Cited

U.S. PATENT DOCUMENTS

| | | | |
|---|---|---|---|
| 5,202,765 | A | 4/1993 | Lineberry |
| 5,740,075 | A | 4/1998 | Bigham et al. |
| 5,784,683 | A | 7/1998 | Sistanizadeh et al. |
| 5,923,379 | A | 7/1999 | Patterson |
| 5,971,921 | A | 10/1999 | Timbel |
| 5,983,068 | A | 11/1999 | Tomich et al. |
| 6,209,025 | B1 | 3/2001 | Bellamy |
| 6,282,189 | B1 | 8/2001 | Eames |

(Continued)

OTHER PUBLICATIONS

Frank, Edward and Holloway, Jack; "Connecting the Home with a Phone Line Network Chip Set", IEEE Micro, Mar.-Apr. 2000, pp. 2-14.

*Primary Examiner*—Stella Woo
(74) *Attorney, Agent, or Firm*—Townsend and Townsend and Crew LLP

(57) ABSTRACT

A network interface device located at a customer's premises includes an external interface that receives a plurality of telecommunication services via a fiber optic connection from a telecommunication service provider. The services are received using Internet Protocol. The network interface device also includes at least two distinct internal interfaces that distribute the plurality of telecommunication services to at least two distinct internal transport media. The network interface device also includes a processor that is programmed to receive combined signals comprising the telecommunication services from the external interface, process the combined signals into separate signals representative of distinct telecommunication services, and map each of the separate signals to separate ones of the at least two distinct internal interfaces for distribution at the customer's premises via the internal transport media.

54 Claims, 17 Drawing Sheets

U.S. PATENT DOCUMENTS

2003/0026418 A1      2/2003  Fusco
2003/0189935 A1 *   10/2003  Warden et al. ......... 370/395.21
2003/0236916 A1 *   12/2003  Adcox et al. ............... 709/245
2004/0141758 A1 *    7/2004  El-Reedy ................. 398/167.5
2004/0213286 A1 *   10/2004  Jette et al. .................. 370/466

* cited by examiner

FIBER OPTIC INTERNET PROTOCOL NETWORK INTERFACE DEVICE AND METHODS AND SYSTEMS FOR USING THE SAME

CROSS-REFERENCES TO RELATED APPLICATIONS

This application is a continuation-in-part application of U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; is a continuation-in-part application of U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al.; is a continuation-in-part application of U.S. patent application Ser. No. 10/356,338, entitled "CONFIGURABLE NETWORK INTERFACE DEVICE AND SYSTEMS AND METHODS FOR ITS USE," filed Jan. 31, 2003 by Bruce A. Phillips et al.; is a continuation-in-part of U.S. patent application Ser. No. 10/367,596, entitled "SYSTEMS AND METHODS FOR DELIVERING A DATA STREAM TO A VIDEO APPLIANCE," filed Feb. 14, 2003 by Steven M. Casey et al.; is a continuation-in-part of U.S. patent application Ser. No. 10/367,597 entitled "SYSTEMS AND METHODS FOR PROVIDING APPLICATION SERVICES," filed Feb. 14, 2003 by Steven M. Casey et al.; and is a continuation-in-part of U.S. patent application Ser. No. 10/377,280 entitled "ADSL/DBS NETWORK INTERFACE DEVICE AND METHODS AND SYSTEMS FOR USING THE SAME," filed Feb. 27, 2003 by Bruce A. Phillips et al., the entire disclosure of each of which is herein incorporated by reference for all purposes.

This application is also related to co-pending, commonly assigned, and concurrently filed U.S. patent application Ser. No. 10/715,878 entitled "DOCSIS NETWORK INTERFACE DEVICE AND METHODS AND SYSTEMS FOR USING THE SAME," by Bruce A. Phillips et al., the entire disclosure of which is herein incorporated by reference for all purposes.

BACKGROUND OF THE INVENTION

The present invention relates to the provision of telecommunication services. In the past, there has been no consistent interface between telecommunication service providers' networks and their customers' premises wiring. For instance, telephone service often has been hard-wired to the customer's premises wiring by a variety of methods, rendering service calls unnecessarily complicated and intrusive. Such service calls often required service personnel to enter the customer premises, creating logistical issues for the telecommunication service provider and increasing customer frustration. Moreover, the lack of any discrete interface between the customer's premises wiring and the provider's network sometimes forced the use of proprietary hardware from the customer's perspective and limited the provider's flexibility when considering options to upgrade or otherwise modify the network.

This problem has been exacerbated by the increased number of telecommunication services provided to customer premises. For instance, many telecommunication service providers now provide xDSL service to their customers, but those skilled in the art will recognize that there is little (if any) standardization among providers. Thus, implementations vary widely, each requiring different hardware and software configurations to be operable, and customers have little flexibility in choosing hardware. For instance, ADSL service frequently is deployed differently than VDSL service, and ADSL deployments themselves can vary from provider to provider. Likewise, telephone wiring schemes can vary widely among customer premises, requiring different types of hardware to enable and enhance services, such as filters to control interference, and the like. Further, a typical customer premises has multiple wiring networks, including one for video distribution (cable, satellite, VDSL, and the like), one for data distribution (Ethernet or the like, perhaps with a connection to an xDSL modem or cable modem), and another for telephone service, and these networks generally operate independently of one another. And if a customer wants to add a new telecommunication service, an expensive service call (often including one or more new cable drops and/or the installation of new premises wiring) likely will be required.

Similarly, while a single telecommunication customer often will receive several telecommunication services from a variety of providers, each of those services generally will require both its own access point to the customer premises as well as its own transport medium within the customer premises. This undesirable duplication not only can add expense to the provision of telecommunication service, it often multiplies the logistic and maintenance issues associated with providing and receiving the telecommunication services.

For instance, those skilled in the art will recognize that a typical customer might have satellite television service and xDSL Internet service. Each of these services might require one or more access points to the house. A satellite dish might require, for example, a dedicated coaxial connection from the dish to each television at the consumer premises. Moreover, a telephone jack often is required at one or more of the television locations, to provide an upstream connection from the customer premises to the satellite provider (for instance, to provide billing information, etc.) Likewise, xDSL service typically will require a DSL modem, as well as an Ethernet connection with each device for which Internet access is desired. Thus, while neither satellite service nor typical xDSL service alone can provide a robust data/video solution to compete with broadband cable providers, there also is no facility for combining these services seamlessly at a customer premises.

Given the wide variety of telecommunication information and services available in the marketplace, it would be helpful if a single provider could allow multiple information providers to initiate services to a customer premises, increasing both efficiency for the providers and ease-of-use for the customer. This proliferation of telecommunication services also has created a need for a more flexible interface between the telecommunication service provider's network and the customer's premises. It would be beneficial for such interfaces to use maximize usage of existing infrastructure used to deliver telecommunication services to customer premises.

BRIEF SUMMARY OF THE INVENTION

Embodiments of the present invention a network interface device located at a customer's premises. The network interface device includes an external interface that receives a plurality of telecommunication services via a fiber optic connection from a telecommunication service provider. The services are received using Internet Protocol. The network interface device also includes at least two distinct internal interfaces that distribute the plurality of telecommunication services to at least two distinct internal transport media. The network interface device also includes a processor that is programmed to receive combined signals comprising the telecommunication services from the external interface, process the combined signals into separate signals representative of distinct telecommunication services, and map each of the separate signals to separate ones of the at least two distinct internal interfaces for distribution at the customer's premises via the internal transport media.

In some embodiments the external interface is further configured to direct signals relating to the telecommunication services to the telecommunication service provider via the fiber connection using Internet Protocol. At least one of the at least two distinct internal interfaces may be configured to receive signals relating to one of the telecommunication services from one of the internal transport media. The processor may be further programmed to receive separate signals from the at least two distinct internal transport media, process the separate signals into a combined signal, and direct the combined signal to the external interface for distribution to the telecommunication service provider via the fiber optic connection using Internet Protocol.

The network interface device also may include a signal integrator in communication with the at least two distinct internal interfaces. The signal integrator may be operable to integrate signals from the at least two distinct internal transport media into a combined information set. At least one of the internal transport media may include a coaxial cable. At least one of the internal transport media may include a twisted pair cable. The twisted pair cable may include existing telephone wiring at the customer premises. The twisted pair cable may include an Ethernet cable. The fiber optic connection may include a single-strand fiber optic connection capable of providing two-way communication. The single-strand fiber optic connection may use either or both of wave-division multiplexing and time-division multiplexing. The fiber optic connection may include a multi-strand fiber optic connection.

In some embodiments the external interface may include at least one multiplexer. The telecommunication services may include one or more selections from the group consisting of video, data, and voice. The different telecommunication services may be transported in different frequency ranges. The internal interfaces may include a selection from the group consisting of IEEE 1394, RG6, RG59, wireless interface, 802.11, LMDS, Ethernet, twisted pair, category 3, category 4, category 5, category 6, category 7, and coaxial. The signals may be transported on the internal transport media using a protocol selected from the group consisting of HPNA, HPNA+, and Home Plug. The plurality of telecommunication services may originate from a plurality of telecommunication service providers.

According to other embodiments, a system for providing telecommunication services to a customer's premises includes an external transport medium comprising a fiber optic distribution system that uses Internet protocol to deliver the telecommunication services to the customer's premises and a network interface device at the customer's premises. The network interface device may include an external interface that receives a plurality of telecommunication services via the external transport medium, at least two distinct internal interfaces that distribute the plurality of telecommunication services to at least two distinct internal transport media, and a processor. The processor is programmed to receive combined signals comprising the telecommunication services from the external interface, process the combined signals into separate signals representative of distinct telecommunication services, and map each of the separate signals to separate ones of the at least two distinct internal interfaces for distribution at the customer's premises via the internal transport media.

Other embodiments of the present invention provide a method of delivering a plurality of telecommunication services to a customer's premises. The method includes receiving combined signals comprising the telecommunication services from a telecommunication service provider via an external interface to a fiber optic connection. The services are received using Internet Protocol. The method also includes processing the combined signals into separate signals representative of distinct telecommunication services and mapping each of the separate signals to separate ones of at least two distinct internal interfaces to at least two distinct internal transport media for distribution at the customer's premises via the internal transport media.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a capital letter to denote one of multiple similar components. When reference is made to a reference numeral without specification of a sub-label, the reference is intended to refer to all such multiple similar components.

DETAILED DESCRIPTION OF THE INVENTION

Figure 1A:
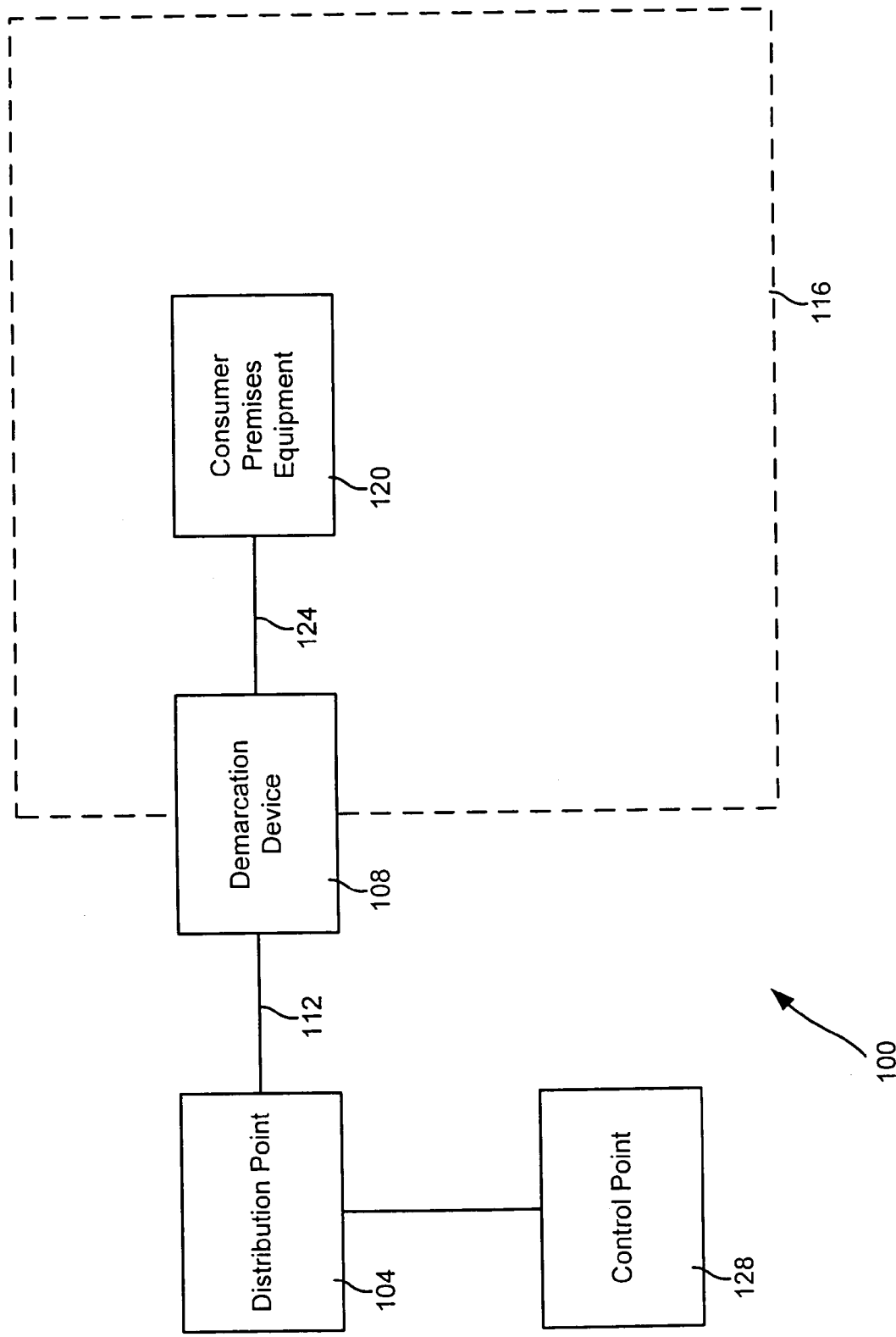
FIGS. 1A–1G illustrate systems for using demarcation devices according to certain embodiments of the invention.

Certain embodiments of the present invention are directed to demarcation devices that can be used to provide telecommunication services, as well as-to methods and systems of using such devices. A demarcation device can be any device capable of serving as an interface between a customer premises and a telecommunication service provider's network. Such devices can include, merely by way of example, set top boxes (which can be used, inter alia, as an interface between a customer's video appliance and a provider's video network), broadband modems (including xDSL modems, cable modems and wireless modems, each of which can be used to provide video and/or data to a customer premises), integrated access devices (which can, for instance, translate between Voice over EP ("VoIP") signals and traditional telephone signals, thus allowing traditional telephones to connect to a VoIP network), devices compatible with the session initiation protocol ("SIP") familiar to those skilled in the art, and/or the like. One particular demarcation device is a network interface device ("NID"), described in detail below. In certain aspects, demarcation devices can be used to separate received telecommunication information into discrete sets, and optionally to process certain of those sets independently from other sets and/or transmit different sets to different locations, perhaps through the use of different interfaces.

As used herein, references to the term "telecommunication information" should be interpreted to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC and PAL formatting, as well as, for example, any of the MPEG digital encoding and/or compression algorithms), and data. Such data can be formatted according any of a variety of protocols familiar in the art, including in particular any of the protocols known in the art as part of the TCP/IP suite, in particular the Internet Protocol ("IP"). Data can also include infrastructural protocols, including, for instance, routing protocols and protocols necessary to implement advanced networking schemes known to those skilled in the art, such as multiprotocol label switching ("MPLS"), Ethernet in the first mile ("EFM"), to name but two In this document, the term "telecommunication service provider" can mean any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is used to describe a discrete subset of the telecommunication information transmitted across a particular transport medium and/or received by a demarcation device. Generally, the telecommunication information that is classified part of a particular information set shares a common characteristic. Merely by way of example, an information set can comprise telecommunication information of a particular type (e.g., voice, IP data, encoded video, and such), information associated with a particular application (e.g., information assigned to a specific IP port, as is known in the art, or information used by a particular software and/or hardware program), information addressed to or received from a particular device or network segment, information received within a particular reception window, and the like. Merely by way of example, a demarcation device might transmit simultaneously a first information set comprising video signals, a second information set comprising Internet data, and a third information set comprising information associated with an online gaming application.

In certain embodiments, demarcation devices can support the one-way flow of telecommunication information, as for example, in the case of a simple set top box, which can receive data representing a video signal, decode that data, and transmit a video signal to an attached television. In other embodiments, however, demarcation devices can support bidirectional flow of telecommunication information. For example, an xDSL modem allows the transmission of data both to and from a customer premises. In still other embodiments, a demarcation device can be configured to support both unidirectional and bidirectional information flows simultaneously, depending on the type of telecommunication information transmitted or the source of the information.

In one important aspect, demarcation devices can function to isolate the telecommunication service provider's network from the network at the customer premises. As described in detail below, the service provider's network can be thought of as an "external transport medium," while the customer's network can be termed an "internal transport medium." Both external transport media and internal transport media are types of "transport media," a term used in this document to describe any cable, wire or other medium capable of carrying telecommunication information, including, but not limited to, twisted pair copper wiring (shielded or unshielded, including, for example, unshielded cables complying with industry-standard categories 3, 5, 5e, 6 and 7 and shielded cables commonly known as Token Ring™ cables, to name a few), optical fiber (including both single-mode and multimode fiber, as well as doped fiber, wavelength-division multiplexed, coarse wavelength-division multiplexed, wide wavelength-division multiplexed, dense wavelength-division and ultra-dense wavelength-division multiplexed fiber) and coaxial cable.

Other examples of transport media can also include universal serial bus ("USB") cable, cable complying with the Institute of Electrical and Electronics Engineers' ("IEEE") 1394 standard, as well as any medium capable of complying with the many local area networking standards known in the art. Of course, a transport medium need not be a physical medium; it can also comprise any of a wide variety of wireless transmissions, including (but not limited to) infra-red transmissions, radio frequency ("RF") transmissions, and transmissions complying with standards developed by any of the IEEE's working groups governing wireless communication (e.g., the 802.11, 802.15, 802.16 and 802.20 working groups). Similarly, a transport medium can comprise other wireless technologies, such as point-to-point microwave, including local multipoint distribution system ("LMDS"), microwave multipoint distribution system and/or multipoint multi-channel distribution system (collectively, "MMDS") transmissions, and satellite, cellular/PCS, and/or ultra wideband transmissions, to name a few.

In certain embodiments, a demarcation device can act as an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media and/or other operational parameters of a network. This feature can provide many benefits; for instance, the demarcation device can'serve as a disclosed interface between a customer premises and a provider's network, allowing the provider to implement changes in its network without disrupting the service provided to the customer.

Likewise, the isolation of the internal transport medium from the external transport medium can allow for any variety of customer premise equipment ("CPE") (which can be any device that sends, receives or otherwise utilizes telecommunication information) to be used at the customer premises without fear that the appliance might be incompatible with a particular telecommunication service provider's standards. Moreover, a demarcation device might serve to couple a plurality of external and/or internal transport media, allowing interoperation among them all, and provide the same isolation features among all of these media.

In this way, certain aspects of the demarcation devices can allow for sales of a wide variety of CPE on a consumer electronics model, instead of the proprietary model necessitated by many of today's telecommunication networks, where, for example, differing implementations of xDSL among providers virtually force consumers to purchase modems supplied or approved by a particular provider to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits can flow from embodiments of the invention.

In accordance with other embodiments, the isolation abilities of demarcation devices also can allow a demarcation device to serve as an insulator between different transport media coupled to the internal and external transport media in order, for instance to prevent unwanted telecommunication information from one network from entering the other network. For instance, a demarcation device in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation devices can prevent the contamination of the internal transport medium with unwanted information from the external medium, interference between two or more external transport media coupled to a demarcation device, and unwanted interference or crosstalk between multiple internal media.

The ability of a demarcation device to isolate the internal transport medium from the external transport medium also allows demarcation devices in some embodiments to be used to provide enhanced security for the customer and/or control customer access to certain features or services. For instance, those skilled in the art will recognize that a demarcation device can prevent unauthorized access (by a telecommunication service provider and/or a third party) to the customer's data network, or can screen or filter telecommunication information entering or leaving the customer's premises, enabling features like parental controls on incoming and outgoing information, as well as the filtering of outgoing sensitive information (such as credit card information and the like).

Further, according to certain embodiments, the demarcation device, as the consolidation point for all telecommunication information entering or leaving the customer premises, can provide a variety of enhanced features to the entire premises, including things like caller identification, premises-wide telephone, video and data distribution, content (e.g., video, audio or data) on demand, and the like. These and other features of the demarcation devices also allow for a variety of new and useful telecommunication applications to be provided to customers. Details about some exemplary applications are discussed below; given the disclosure herein, those skilled in the art can appreciate the wide variety of such applications that are possible using various embodiments of the invention.

Those skilled in the art will recognize that, in certain cases, it may be desireable to provide a particular levels of service to a customer premises. Such quality of service ("QoS") considerations can include, for instance, a guaranteed bandwidth to a certain application or device, such as in the case of streaming video and/or audio applications. Another consideration for some telecommunication applications can be latency rates; for example, a low latency rate may be desirable in order to maintain the fidelity of voice communications. For these and other reasons, demarcation devices, in accordance with certain embodiments of the invention, can be configured to identify, enforce and/or maintain QoS levels and/or requirements.

Merely by way of example, in certain cases, demarcation devices can provide signal strength enhancement functions, which can vary according to the information transmitted and/or media used. For instance, an amplifier can be supplied in a demarcation device to enhance the strength of analog signals. With respect to digital signals, a regenerator can be employed in a demarcation device to enhance signal strength. Those skilled in the art will recognize that a wide variety of signal strength enhancement devices can be used in accordance with embodiments of the invention.

In other embodiments, demarcation devices can accommodate/provide various service levels, which, in some cases, can correspond to various service classes in an asynchronous transfer mode network. For instance, a demarcation device can support undefined bit rate transmissions, available bit rate transmissions, variable bit rate (both real-time and near real-time) transmissions, and constant bit rate transmissions, to name a few. Thus, for instance, a demarcation device can provide undefined bit rate transmission services to a data application, real-time variable bit rate transmission services for voice applications, and constant bit rate transmission services for video applications.

In some aspects, mediating the communications between one or more external transport media and one or more internal transport media can include providing/enforcing these service levels, for instance, regulating a burst data transmission from a computer at the customer premises so as not to impact the constant bit rate needed to provide video service to a television at the customer premises. Those skilled in the art will appreciate, based on the disclosure herein, that certain demarcation devices can also support circuit emulation services ("CES"), allowing the provision of constant bit rate service classes over an ATM network, among other things.

Other QoS functions can be supported by various embodiments of demarcation devices as well. For instance, in accordance with certain embodiments, a demarcation device (perhaps incorporating router functionality) can implement the resource reservation protocol (including traffic engineering extensions), ("RSVP" and "RSVP-TE," respectively) familiar to those skilled in the art, to allow for dedicated bandwidth paths, for instance, between a device at the customer premises and a telecommunication information provider. Other embodiments can support a variety of inter-networking technologies and protocols, including, merely by way of example, virtual local area network ("VLAN") tags, pushing labeled switched paths ("LSP"), and differentiated services ("DIFFSERV"), which can be used, inter alia, to provide necessary levels of service to support various applications and/or types of information sets.

Certain embodiments of the invention provide a variety of systems for utilizing demarcation devices. Merely by way of example, FIGS. 1A–1G illustrate several such exemplary systems. For instance, FIG. 1A illustrates a system 100 for providing telecommunication services using a demarcation device, in accordance with some embodiments of the invention. System 100 includes a distribution point 104 in communication with a demarcation device 108 via external transport medium 112. In one sense, distribution point 104 can be considered the source of telecommunication information transmitted to customer premises and the recipient of telecommunication information transmitted from customer premises 116, although, as described below, distribution point 104 often will be neither the ultimate source nor the ultimate recipient of telecommunication information. In certain embodiments, distribution point 104 can be a telecommunication service provider's local office; in other embodiments, distribution point 104 can be another network element in the service provider's network, for instance, a remote termination cabinet and/or a digital subscriber line access multiplier ("DSLAM"). In fact, distribution point 104 can be any facility or equipment operated by a telecommunication service provider that is capable of transmitting telecommunication information to, and/or receiving telecommunication information from, a customer premises.

In general, distribution points can be classified, inter alia, as discrete distribution points or complex distribution points. With respect to a particular information set, a discrete distribution point often transmits only the necessary or desired information to the NID. In contrast, a complex distribution point can transmit the entire information set to the NID. The contrast may be illustrated with regard to video distribution: A discrete distribution point may perform channel switching (at the request of the demarcation device), encoding and sending only the desired channel information to the demarcation device. In contrast, a complex distribution point might rely upon the demarcation device to perform all channel switching. Those skilled in the art will appreciate that each scheme presents relative advantages and disadvantages.

Distribution point 104 can be capable of transmitting and/or receiving any type of telecommunication information to/from demarcation device 108, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises (perhaps via a demarcation device at each customer premises) and often is neither the ultimate source nor the ultimate recipient of telecommunication information. Instead, distribution point 104 often can serve as the intermediary between one or more customer premises (e.g., 116) and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises and any source and/or recipient of telecommunication information that has a connection to the Internet. The interconnection of telecommunication networks is well known in the art and need not be discussed here, other than to note that distribution point 104 can be configured to transmit telecommunication information to (and receive telecommunication information from) virtually any source or recipient of telecommunication information, through either direct or indirect (e.g., through the Internet) communication. Merely by way of example, a distribution point can transmit video signals received from a television programming provider to customer premises equipment, as described in the applications referenced above. In other embodiments, distribution point 104 can be in communication with one or more other customer locations, allowing for private virtual circuits between customer premises 116 and those locations.

In system 100, demarcation device 108 can serve as the interface between external transport medium 112 and customer premises 116. As conceptually illustrated in FIG. 1A, demarcation device 108 can be attached to an external wall of customer premises 116, which provides many advantages. For instance, if the telecommunication service provider desires to upgrade or otherwise change its network (including, perhaps, modifying external transport medium 112), a technician can perform any necessary changes at demarcation device 108 without entering the customer premises. Coupled with the ability of some demarcation devices to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises. Of course, demarcation device 108 also may be located at a variety of other locations, for example, within customer premises 116 or at a facility operated by the telecommunication service provider (e.g., distribution point 104). As discussed in detail below, a demarcation device may also be divided, with different portions situated at different locations, according to the requirements of the implementation.

Demarcation device 108 can communicate with CPE 120 (which can be located inside customer premises 116) through internal transport medium 124, which can comprise any of the media discussed above. In particular, internal transport medium 124 can comprise the existing telephone wiring in customer premises 116 and, in some embodiments, is capable of carrying voice, data and video information, as well, perhaps, as other types of telecommunication information, using any of a variety of multiplexing schemes. For instance, as described in Edward H. Frank and Jack Holloway, "Connecting the Home with a Phone Line Network Chip Set," *IEEE Micro* (IEEE, March-April 2000), which is incorporated herein by reference, the Home Phoneline Networking Alliance ("HPNA") standards allow for simultaneous transmission of both voice information and Ethernet frames across twisted-pair copper telephone wiring. The term "consolidated distribution protocol" refers to any transmission protocol or convention that can be used to transmit multiple disparate information types on a shared medium. HPNA can be considered one type of consolidated transmission protocol, as can the related HPNA+ protocol, as well as the HomePlug™ standard, discussed in detail below. Any time multiple discrete information sets are transmitted on a shared/common transport medium (or a shared/common set of transport media), those information sets can be termed, collectively, "combined information sets." Often, a combined information set will be formatted with a consolidated distribution protocol, although those skilled in the art will recognize that such formatting is not always necessary; different information sets sometimes can share a common medium without needing to be translated with a consolidated transmission protocol.

Thus, telecommunication information received by distribution point 104 from any source (for instance, those discussed above) can be transmitted from distribution point 104 through external transport medium 112 to demarcation device 108. Demarcation device 108 can then transmit the information through internal transport medium 124 to CPE 120. Likewise, telecommunication information can be transmitted via the reverse path to distribution point 104, where it can, for instance, be transmitted to an information recipient, such as a service provider (for instance, to request a pay-per-view movie or the like) or across the Internet to a recipient (such as in the case of an email message).

In certain embodiments, demarcation device 108 can receive configuration information, in some cases from a control point (e.g., 128), which, in the illustrated embodiment, is associated with distribution point 104. In certain instances, control point 128 can be software and/or hardware operated by a telecommunication service provider for controlling certain features of the operation of demarcation device 108. For instance, control point 128 can instruct demarcation device 108 to provide (or cease to provide) a particular telecommunication service (e.g., video distribution) to customer premises 116, or to control how many information sets and/or transport media demarcation device 108 should accept at any given time. Control point 128 can also provide other direction to demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand. Control point 128 can further be used to test the availability, functioning and/or performance of demarcation device 108, and/or any of the transport media attached thereto. Merely by way of example, control point 128 can be used to perform a loop test, known to those skilled in the art.

Often, it may be beneficial to allow the customer to provide configuration information to demarcation device 108. Thus, in certain embodiments, control point 128 can have a web interface, such that the customer (or any authorized person, such as an employee of the telecommunication service provider or telecommunication information provider) may log on to the web interface and configure options for demarcation device, perhaps resulting in configuration commands being transmitted from distribution point 104 to demarcation device 108. In other embodiments, control point 128 can be a web interface to demarcation device 108 itself, allowing the customer (or, alternatively, a telecommunication service provider or telecommunication information provider) to configure demarcation device 108 directly. In still other embodiments, control point 128 can communicate with demarcation device through an application programming interface ("API"). Hence, in some aspects, control point 128 can interface with demarcation device 108 through an API.

Those skilled in the art will recognize that, in some embodiments, an API can include a set of software, hardware or firmware routines or libraries that may be invoked programmatically to configure or relay information to demarcation device 108. In that sense, then, control point 128 can be understood to be a program running on a computer (perhaps located at distribution point 104 or customer premises 116, among other locations) that provides configuration information to demarcation device via using a software API. In other embodiments, however, an API can include a physical interface (perhaps adapted to communicate using any of the transport media discussed herein), that may be accessed remotely and/or locally, for instance, by a service technician.

Merely by way of example, a service technician could visit customer premises 116, attach a laptop computer (or other configuration device) to demarcation device 108, and upload information to demarcation device 108, including perhaps both configuration information and other telecommunication information. In still other embodiments, demarcation device 108 can accept configuration information through other means, including merely by way of example, providing a web interface (especially in embodiments where demarcation device 108 is capable of acting as a web server, as discussed below) and/or receiving a specially-formatted electronic message, either of which could be considered a control point in such embodiments.

As described below, demarcation device 108 (and/or particular components thereof) can be addressable/and or programmable (e.g., through control point 128). As such, demarcation device 108 can include a storage device, which can be any device known to those skilled in the art as one capable of storing information (including, merely by way of example, any of the memory and/or storage devices discussed below), for storing configuration information received from control point 128. As discussed below, the storage device can also store other telecommunication information.

Configuration information can be any set of data or other information that can be interpreted by demarcation device 108 as operational instructions, including, but not limited to, commands to process certain information sets in certain ways (e.g., provide protocol conversion, allow transmission of the information set, deny transmission of the information set, direct transmission on a particular interface, and the like), commands to provide (or cease providing) a particular service (e.g., to provide access to a pay per view movie or an additional telephone line). Thus, in certain aspects, a telecommunication service provider can control the services provided to a customer in several ways. First, the provider can transmit a telecommunication information set to a demarcation device only if the user of that device is authorized to receive the service associated with that information set. Alternatively, the service provider could send one or more services to a customer's demarcation device regardless of the customer's authorization to use, the services, and rely on the device itself to prevent unauthorized access to those services.

Those skilled in the art will appreciate that certain control methods are more well-suited to certain services than to others. For instance, with respect to cable television services, the same set of information may be broadcast to many households, and the demarcation device is well-suited to control access to those services, allowing for greater efficiency in the providing of such services. In contrast, video on demand services may be controlled at a distribution point (or elsewhere), such that a demarcation device will only receive video on demand information if the customer already has requested (and been authorized to receive) that service, and the demarcation device thus may not need to provide access control functions with respect to that service.

According to some embodiments, demarcation device 108 can implement either of these access control schemes, or both in combination, as well as others. Moreover, demarcation device 108 can, in some cases, be configured to support a plurality of schemes transparently, so the customer can, for instance, request a service from demarcation device 108 (perhaps using one of the methods discussed above), and demarcation device can relay that request to the appropriate telecommunication service provider (and/or telecommunication information provider) if necessary, as well as reconfigure itself to allow access to that service, if necessary. Of course, demarcation device 108 also can be configured to take any necessary validating or authenticating action (such as notifying distribution point 104 and/or control point 128 that the service has been requested, and, optionally, receiving a return confirmation that the service has been authorized).

In accordance with other embodiments, configuration information sent to demarcation device 108 can include one or more commands to interface with and/or control a particular home fixture in a certain way. The term "home fixture" should be interpreted to mean any outlet, fixture, or device (including without limitation those that function electrically and/or any CPE) that can be intelligently controlled. Home fixtures can include, merely by way of example, any device, outlet, or other equipment that can be included in the "smart home" or "connected home" concepts familiar to those skilled in the art. For instance, configuration information could instruct demarcation device 108 to turn on and/or off certain lights, electrical outlets and/or equipment (perhaps via additional devices), and/or to arm, disarm or otherwise monitor and/or configure a home security system. One skilled in the art, will recognize, moreover, that although termed "home fixtures" for ease of description, home fixtures can easily be located in MDUs and business premises as well.

Configuration information can also include operational data such as an IP address, routing information, and the like, to name but a few examples. Configuration information can further include instructions to modify one or more security settings of demarcation device 108. Merely by way of example, in certain embodiments, demarcation device 108 can include a computer virus scanner, and configuration information can include updated virus definitions and/or heuristics. Likewise, demarcation device 108 often will be configured with access controls (for instance, to prevent unauthorized access through demarcation device 108 by third parties, as described elsewhere in this document), and configuration information can include instructions on how to deal with particular third party attempts to access demarcation device 108 or internal transport medium 124. Those skilled in the art will recognize as well that some security settings may specify the level of access the customer has to the functions of demarcation device 108, for instance to prevent unauthorized use of certain telecommunication services, and that these settings also may be modified by received configuration information.

Based on the disclosure herein, those skilled in the art will recognize that a wide variety of configuration information can be transmitted to demarcation device 108, including those examples discussed above. Moreover, some types of configuration information may be sent periodically to demarcation device 108 to ensure that the configuration of demarcation device is current. Those skilled in the art will also recognize that configuration information can, in a sense, be considered a subset of the broader category of telecommunication information.

Figure 1B:
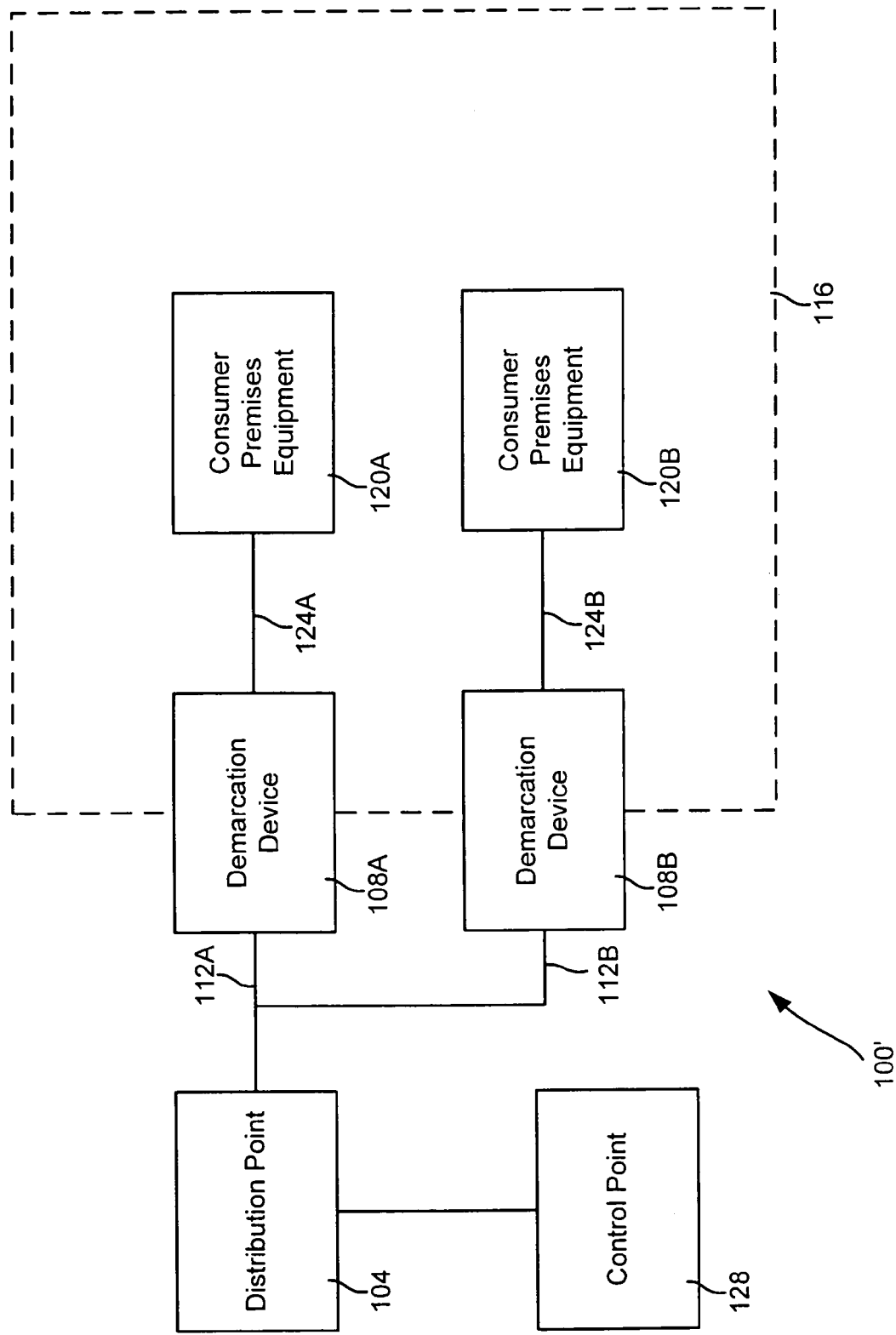

Turning now to FIG. 1B, system 100' is illustrative of certain embodiments, which can provide multiple demarcation devices 108A, 108B at customer premises 116. As noted above, demarcation device 108A can be in communication with CPE 120A through internal transport medium 124A, and demarcation device 108B likewise can be in communication with CPE 120B through internal transport medium 124B. Demarcation device 108B can communicate with distribution point 104 through external transport medium 112B which, as illustrated by FIG. 1B, can simply be spliced into external transport medium 112A (for example, using one or more active and/or passive splitting devices, which could be optical, as in a fiber environment, for example, or electrical). If necessary, demarcation devices 108 and/or distribution point 104 can include control logic to prevent unauthorized access by demarcation device 108A to telecommunication information sent to (or received from) demarcation device 108B, and vice-versa. In other embodiments, external transport medium 112B could run directly from demarcation device 108B to distribution point 104, or external transport medium 112B can be omitted, and demarcation device 108B can be coupled to demarcation device 108A, which can provide connectivity between demarcation device 108B and distribution point 104 through external transport medium 112A.

System 100' can be used in a variety of implementations. For instance, if customer premises 116 is a multiple-dwelling unit ("MDU") or a commercial building, separate demarcation devices can be provided for each separate resident, family and/or tenant (or, alternatively, a single demarcation device, perhaps with more interfaces, can service multiple dwelling or business units). In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice-versa. In some embodiments, demarcation devices can provide a variety of such security, encryption and authentication functions.

Figure 2A:
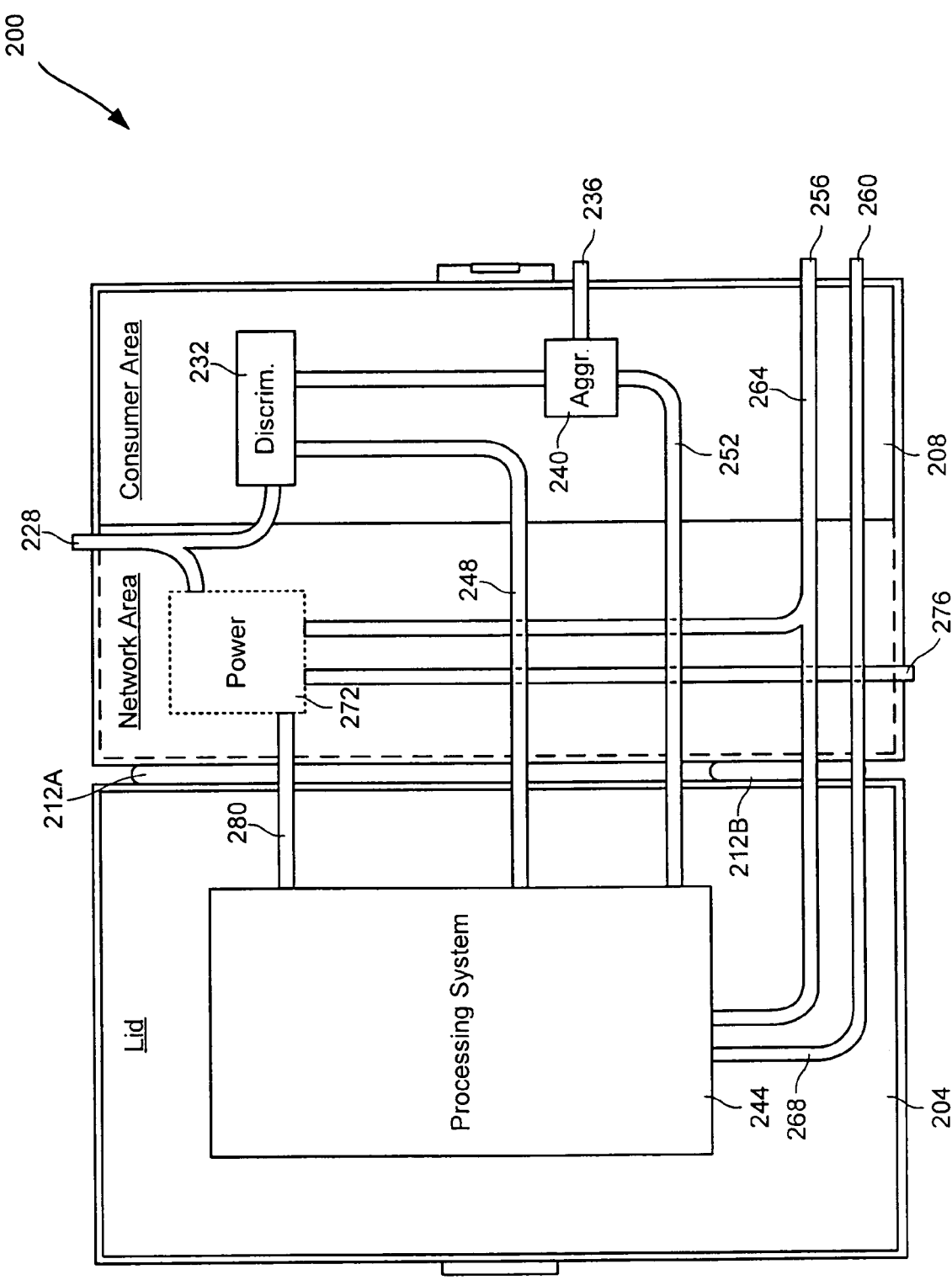
FIG. 2A illustrates a network interface device according to certain embodiments of the invention.

As described above, in certain embodiments, multiple demarcation devices 108A, 108B can be daisy-chained together (using any of the telecommunication media discussed herein). This could allow a telecommunication service provider to provide service to additional customers without requiring any additional external transport media (e.g., 112B). Similarly, demarcation devices at multiple premises can be coupled together (using wired or wireless transport media), such that if the external transport medium coupled to one of the demarcation devices fails, that device can maintain connectivity to the distribution point through its connection to another demarcation device. A demarcation device in accordance with specific embodiments thus may have an interface for securely connecting to one or more additional demarcation devices (thus, perhaps, forming a mesh network of one or more demarcation devices and/or distribution points), that would allow a particular demarcation device to serve as a conduit between another interface device and a distribution point, without allowing any unauthorized reception of telecommunication information intended for the connected interface device. This secure interface can be included, for instance, in a portion of the demarcation device that is inaccessible to customers, as illustrated in FIG. 2A and described below.

Figure 1C:
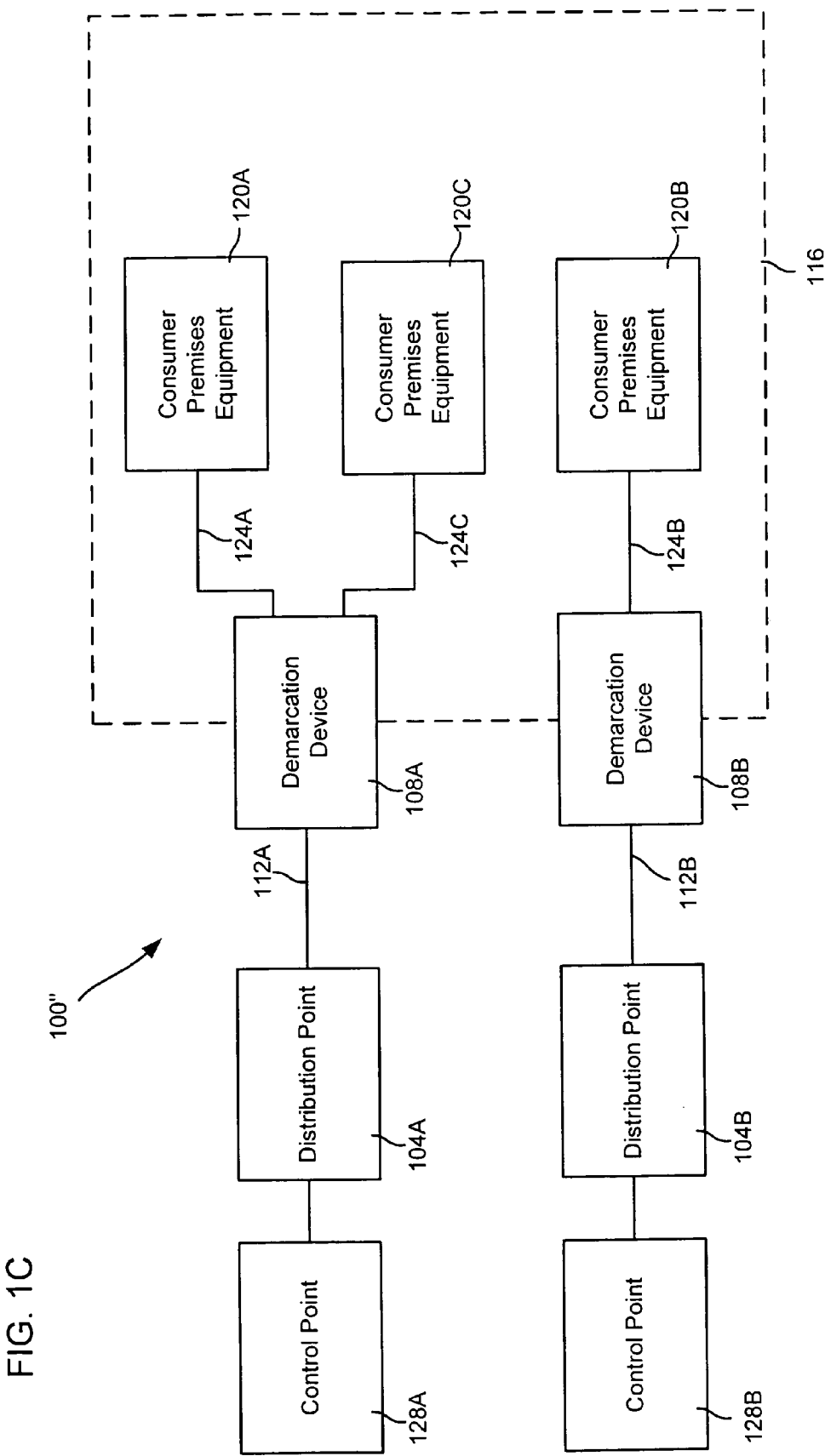

In other embodiments, a single customer premises might have connections to a plurality of telecommunication service providers. For example, turning now to FIG. 1C, system 100" includes a distribution point 104A coupled to demarcation device 108A and also includes a second distribution point 104B coupled to demarcation device 108B via external transport medium 112B. Merely by way of example, distribution point 104B could, for example, be associated with a cable television provider, while distribution point 104A could be associated with a telephone company. Thus, CPE 120A could be a telephone, and CPE 120B could be a television. (Of course, it should be noted that both telephone and video signals, as well as other forms of telecommunication information, can be provided through a single distribution point as well.) Further, as illustrated by example system 100", multiple CPE 120A, 120C can be coupled to a single demarcation device 108 (either through two internal transport media 124A, 124C as illustrated by FIG. 1C, or through a common internal transport medium, as discussed below). As described above, each demarcation device 108A, 108B, can receive configuration information from a control point 128A, 128B respectively.

Figure 1D:
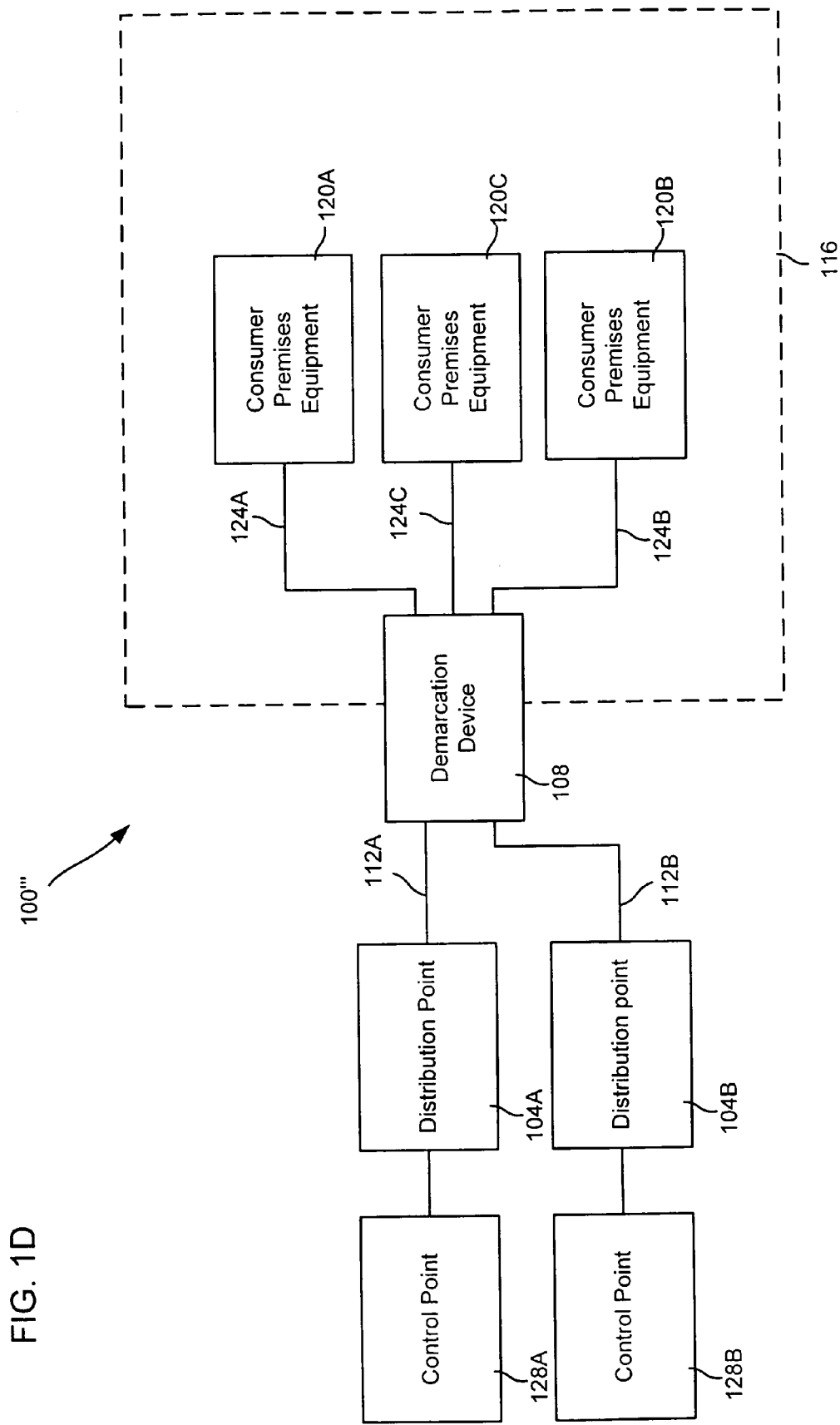

In an alternative embodiment, such as, for example system 100''' illustrated on FIG. 1D, a single demarcation device 108 can provide connectivity to a plurality of distribution points (e.g.,104A, 104B), as well to a plurality of CPE 120A, 120B, 120C. In such an embodiment, demarcation device 108 could include attachments for multiple internal transport media 124A, 124B, 124C and multiple external transport media 112A, 112B. Moreover, as illustrated by FIG. 1D, each distribution point 104A, 104B can be associated with a different control point 128A, 128B, respectively. In alternative embodiments, a single control point could provide configuration information to demarcation device 108 with respect to both distribution points 104A, 104B.

Figure 1E:
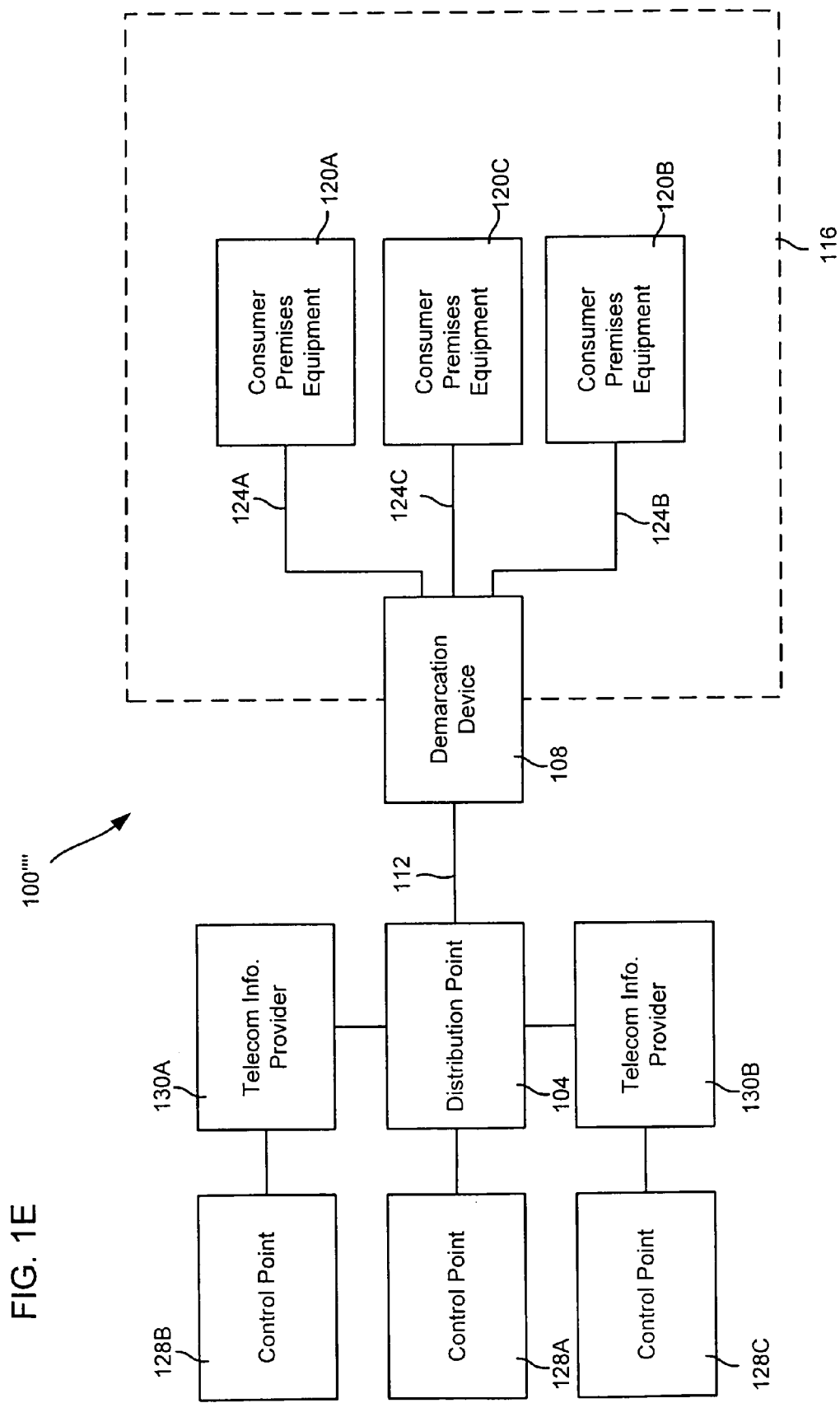

Turning now to FIG. 1E, another exemplary system 100"" is presented in accordance with certain embodiments of the invention. In exemplary system 100"", demarcation device 108 can be in communication with distribution point 104. In turn, distribution point 104 (perhaps operated by a telecommunication service provider) can be in communication with one or more telecommunication information providers 130A, 130B. Each telecommunication information provider 130A, 130B can be the source or recipient of one or more telecommunication information sets (each of which can be associated with a particular telecommunication service), each of which can be transmitted to (or received from) distribution point 104. Distribution point 104 can also transmit these information sets to (or received them from) demarcation device 108, via external transport medium 112. As discussed below, demarcation device 108 can be capable of processing a plurality of such information sets in a variety of ways.

In certain embodiments, each telecommunication information provider 130A, 130B can have an individual control point 128B, 128C. In some such embodiments, control points 128B, 128C can be in communication with demarcation device 108 via distribution point 104, or, alternatively, could have a separate means of communication with demarcation device 108 (e.g., via a modem and telephone line). Thus, in some embodiments, demarcation device 108 can receive configuration information from each control point 128B, 128C. As discussed above, configuration information can direct the behavior of demarcation device 108, in particular with respect to how to handle telecommunication information received from, or sent to, the associated telecommunication information provider.

In some embodiments, demarcation device 108 can be configured to accept configuration information related only to the telecommunication information and/or services provided by the telecommunication information provider sending the configuration information. In this way, demarcation device can be protected against inadvertent (or malicious) misconfiguration, which could interrupt a telecommunication service provided by another telecommunication information provider. Likewise, demarcation device 108 could be configured to automatically request updated configuration information from control point 108A associated with distribution point 104 in the case of misconfiguration, and control point 108A could maintain a master set of configuration information to be able to accommodate such a request.

In other embodiments, telecommunication information providers 130A, 130B may not have an associated control point. In such embodiments, telecommunication information providers 130A, 130B can send configuration information to control point 128A (perhaps via distribution point 104A), and control point 128A can relay that configuration information to demarcation device 108 (again, perhaps through distribution point 104). In this way the telecommunication service provider can control which configuration information is transmitted to demarcation device 108.

In certain embodiments, demarcation device 108 can submit a request for configuration information to one or more control points 128A, 128B, 128C, perhaps via distribution point 104. Such a request might be made, if, for instance, the customer would like to watch a pay per view movie. The appropriate control point (e.g., 128B) could then provide the proper configuration information to demarcation device as described above, and the configuration information could enable demarcation device to transmit the movie to customer premises 116.

Figure 1F:
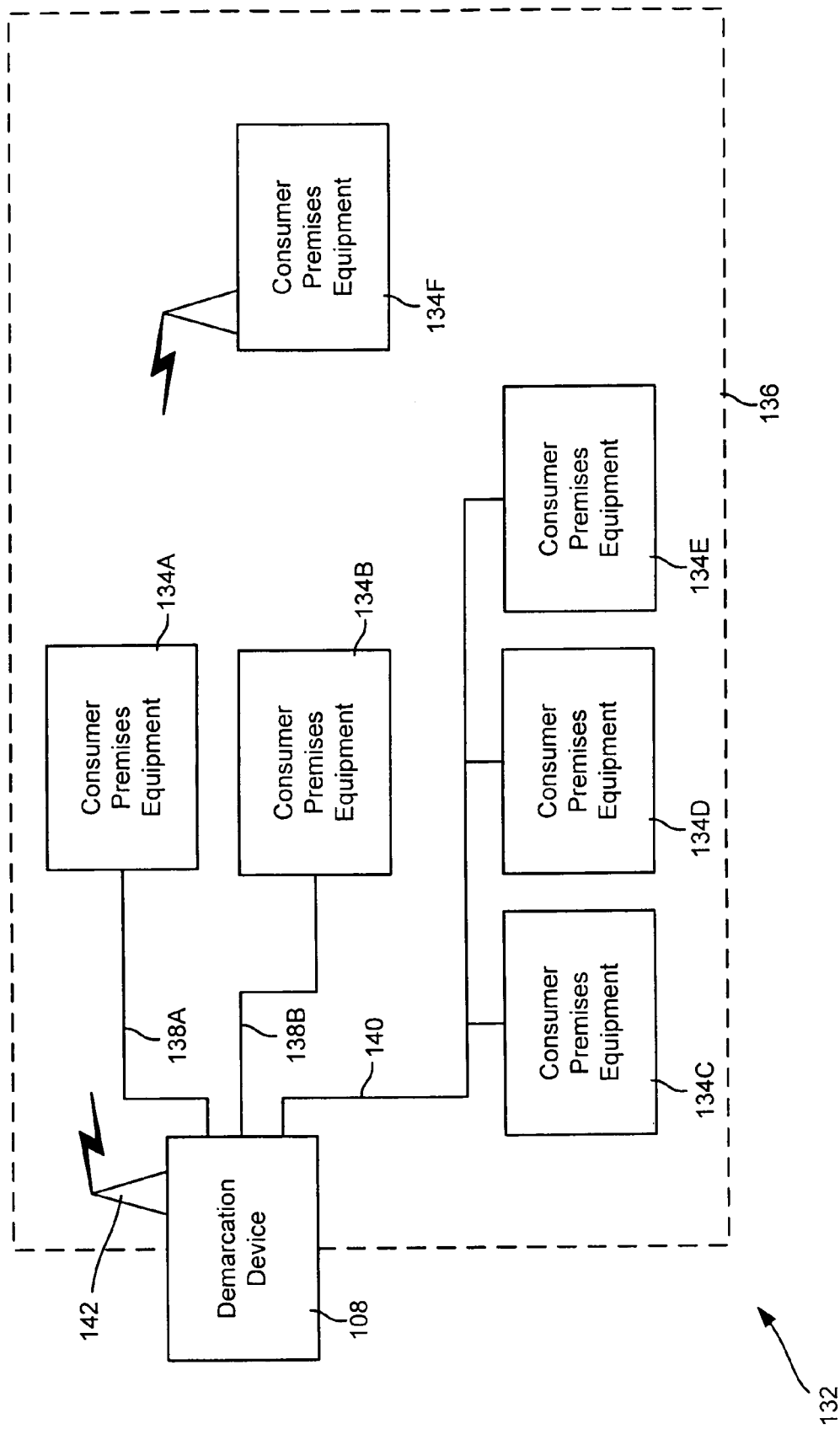

As exemplified by system 132 on FIG. 1F, embodiments of the invention enable a single demarcation device 108 to serve multiple CPE 134A–F, each of which can be a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by system 132, demarcation device 108 can support multiple network topologies. For instance, demarcation device 132 can serve as a hub for a point-to-point network topology, with multiple point-to-point connections to CPE 134A, 134B via internal transport media 138A, 138B, respectively. In addition, demarcation device 132 can support a bus topology, as illustrated by internal transport medium 140, which can connect demarcation device 132 to CPE 134C, 134D, 134E. Demarcation device 108 can also be equipped with a wireless transmitter 142 for communication with wireless-capable CPE 134F. In this way, demarcation device 108 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. Demarcation device 108 can support these and other network topologies, serving as the hub in a 10Base-T network if necessary.

Figure 1G:
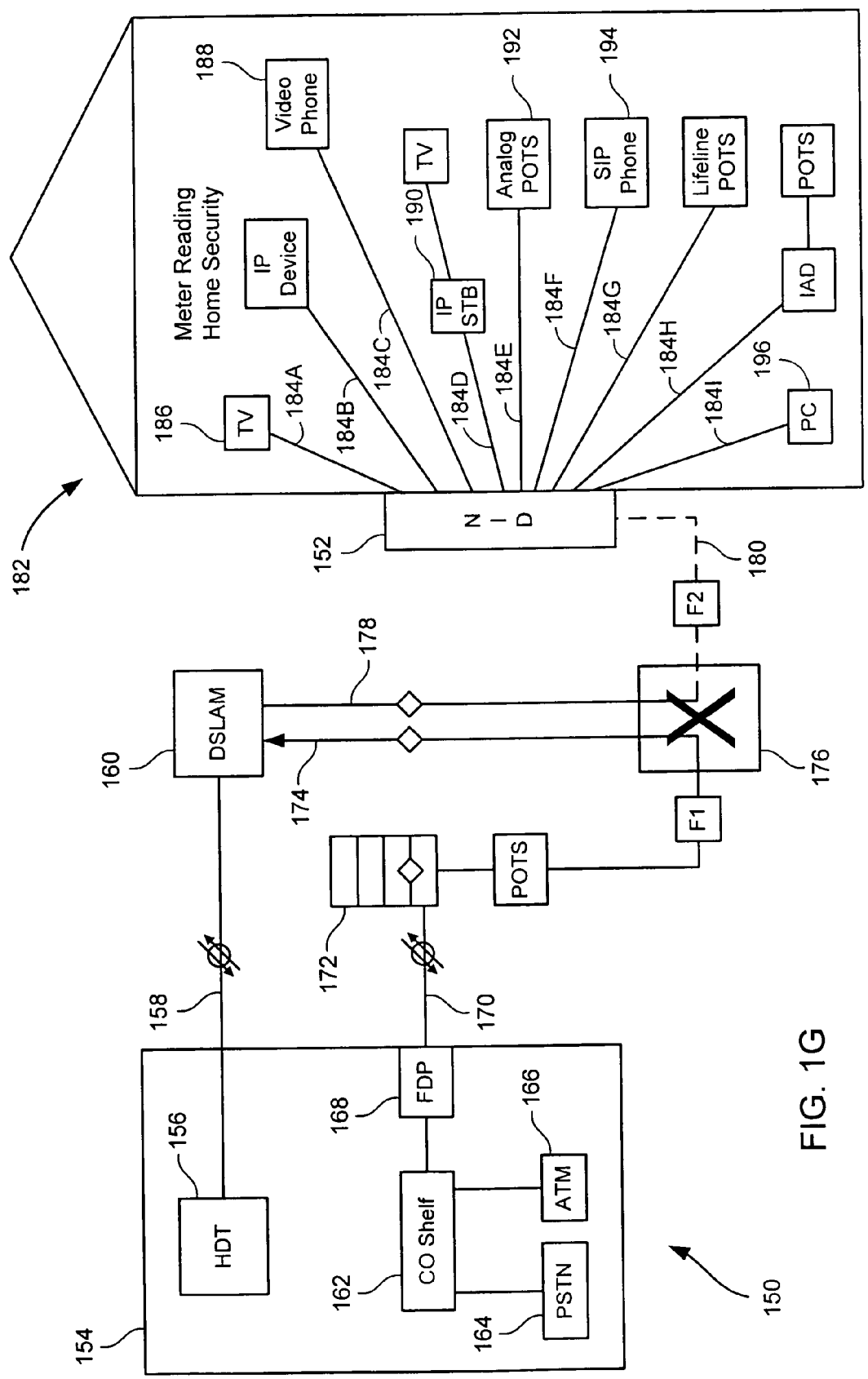

FIG. 1G illustrates another exemplary system 150 for using a demarcation device 152 in an xDSL implementation, according to certain embodiments of the invention. In some embodiments, distribution point 154 can comprise a host digital terminal 156 coupled by transport medium 158 to DSLAM 160. (As noted above, however, in other embodiments, DSLAM 160 or other equipment can be considered the distribution point.) Host digital terminal 156 can be coupled to any of a variety of data sources and/or recipients, either directly, or indirectly (e.g., through the provider's network and/or the Internet). In the illustrated embodiment, transport medium can be a Synchronous Optical NETwork ("SONET") link (e.g., OC-3, OC-12, etc.), although those skilled in the art will recognize that other suitable transport media may be substituted.

In accordance with some embodiments, distribution point 154 also comprises a central office shelf 162 in communication with the PSTN, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets.

As illustrated, these two information sets can be combined at DSLAM 160, which is in communication with serving area interface 176 through transport medium 178. Serving area interface 176 can coupled to demarcation device 152 by transport medium 180, and in the illustrated embodiment, demarcation device 152 is fixedly attached to an exterior wall at customer premises 182. Demarcation device can then be coupled via one or more internal transport media 184A–I to a variety of CPE, including without limitation a television set 186, a video phone 188, an IP-compatible set-top box 190, an analog (POTS) telephone 192, an IP-compatible phone 194, and a personal computer 196. In this way, a demarcation device can be used to provide a plurality of telecommunication services to a customer premises.

As alluded to above, a NID is one type of demarcation device that can serve as the interface between an external transport medium and an internal transport medium. Generally, a NID can incorporate all of the functionality of the demarcation devices discussed above. In addition, in accordance with some embodiments, a network interface device also can offer enhanced functionality in the provision of telecommunication services, as described below.

Figure 2B:
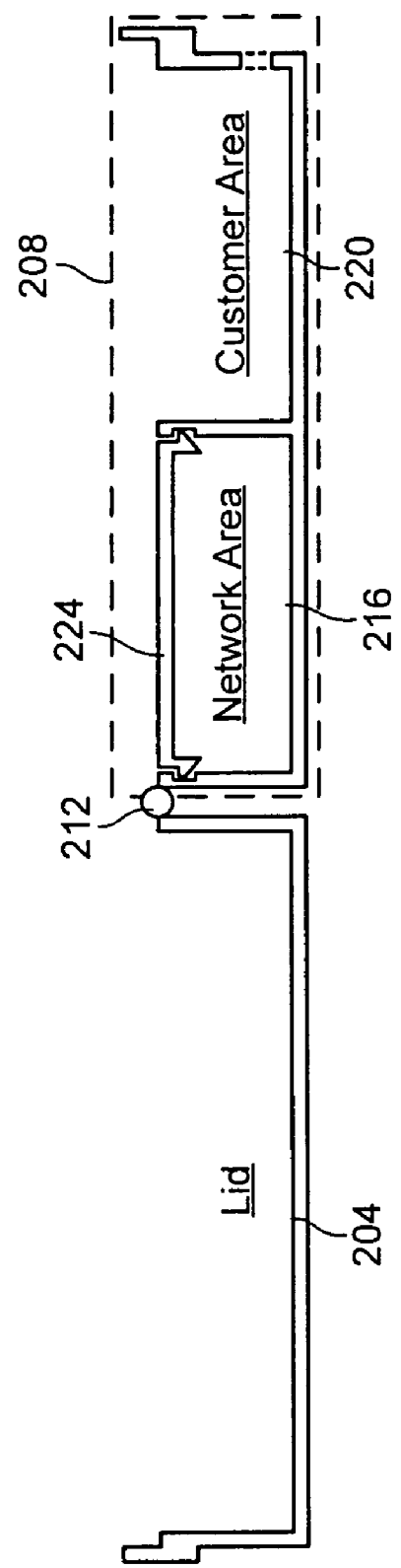
FIG. 2B is a cross-sectional drawing further illustrating the network interface device of FIG. 2A.

Turning now to FIG. 2A, one exemplary embodiment of a NID 200 is illustrated. In the illustrated embodiment, NID 200 comprises a clamshell design, with a lid portion 204 and a body portion 208 connected by hinges 212A, 212B. Turning now to FIG. 2B, it can be seen that body portion comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, NID serves to isolate the telecommunication service provider's network from the customer's network, as described above. As discussed below, lid portion 204 can contain a processing system (not shown in FIG. 2B)

Returning to FIG. 2A, NID 200 can include a first interface 228 for communicating with the provider's external transport medium. Those skilled in the art will recognize that, in some embodiments, as described above, the external transport medium can be the twisted-pair copper "local loop" running from the customer's premises to the telecommunication service provider's local office, and interface 228 can allow for the attachment of the local loop to NID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which NID 200 could include multiple interfaces. In some such embodiments, NID 200 can function to logically couple or bond a plurality of external transport media to one another, seamlessly increasing the bandwith available to the customer premises. For instance, a customer premises might have a satellite link to one telecommunication service provider and an ADSL link to another provider, and NID 200 could combine or multiplex these two links to provide an apparent single, higher-bandwidth to the customer premises. Similarly, those skilled in the art will recognize that, in certain of these embodiments, a particular external transport medium (for instance, a satellite link) may be more well-suited to one way transmission of telecommunication information; in such cases, NID 200 could use a second external transport medium (for instance, an ADSL link) to allow transmission in the other direction.

Interface 228 can be coupled to a discrimination device 232, which can be operative to separate information sets received on interface 228 (and, conversely, aggregate information sets for transmission on interface 228). Merely by way of example, in particular embodiments, discrimination device 232 can separate POTS information from other telecommunication information and/or isolate signals on the internal transport medium from the external transport medium (and vice-versa). In some embodiments, for instance xDSL implementations, discrimination device 232 can comprise one or more filters. Such filters can include (but are not limited to) high-pass, low-pass and/or band pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Demarcation device 232 can be operable to separate information sets through a variety of criteria, including for example, by frequency, by destination device, information type, frequency. Further, in certain embodiments, information sets can be multiplexed (for instance, using various time-division multiplexing or wave-division multiplexing schemes known in the art) for transmission over an external transport medium, and discrimination device 232 can comprise a de-multiplexer capable of separating multiplexed signals and, optionally, routing each signal to the appropriate destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional (perhaps non-POTS) information sets to be sent and received through interface 236 simultaneously with the POTS information. This can include, for example, aggregating information sets for transmission of an HPNA (or HPNA+) signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, and/or memory devices, including both volatile and non-volatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media) In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and OpenBSD™ operating systems.

Telecommunication information (or information sets) can be processed by processing system 244 in a variety of ways, including, for example, routing a given information set to a particular interface, transforming information (for example, encoding/decoding information and converting between different transport protocols), storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality of service requirements (including, for instance, those discussed above), such as latency requirements for voice transmissions and bandwidth requirements for streaming media transmissions, to name a few, and enforce those requirements, ensuring that sufficient bandwidth is provided to a particular device, network segment or application to maintain the quality of service required.

In certain embodiments, for instance, as described above with respect to FIG. 1D, a NID may comprise another interface in communication with a second distribution point 104B, perhaps operated by a different telecommunication service provider, through an additional external transport medium 112A. In such a case, the additional external interface could be coupled to discrimination device 232, or it could be coupled to another discrimination device, which could also be in communication with processing system 244, interface 236 and/or aggregator 240. Thus, certain embodiments allow a single NID to serve as a communication gateway between the customer premises and multiple telecommunication service providers, including combining or multiplexing multiple external transport media (each of which may be in communication with a different telecommunication service provider and/or telecommunication information provider) as discussed above.

Returning to FIG. 2A, processing system 244 can be in communication with aggregator 240, which, as discussed above, can aggregate non-POTS information sets received from processing system 244 and POTS information sets received directly from discrimination device 232 for consolidated transmission via interface 236, among other functions. In effect, discrimination device 232 and aggregator 240 (perhaps in conjunction with processing system 244) can function to separate telecommunication information received on interface 228 into a set of POTS telecommunication information and a set of non-POTS telecommunication (wherein POTS information can be understood to be ordinary telephone signals, and non-POTS information can be understood to include all other telecommunication information), route the non-POTS information via transport medium 248 to processing system 244 for processing, and route the POTS information to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse (i.e., to separate and recombine different sets of telecommunication information received on interface 236 from the customer's premises). Thus, in some embodiments, both discrimination device 232 and aggregator 240 each can perform a combined discrimination device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244 and could route information sets among any of those components as necessary. Moreover, as described below, the functionality of discrimination device 232 and/or aggregator 240 can be incorporated into processing system 244; likewise, discrimination device 232 can incorporate interface 228 and/or aggregator 240 can incorporate interface 236, such that discrimination device/and or aggregator comprise the necessary components to be coupled directly to the external and internal transport media, respectively.

Discrimination device 232 and/or aggregator can also serve another function in certain embodiments: Since the external transport medium is coupled to first interface 228 and the internal transport medium can be coupled to, inter alia, second interface 236, the discrimination device and/or aggregator can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system. In yet other embodiments, the isolation device might comprise a separate piece of hardware in communication with discrimination device 232, aggregator 240 and/or processing system 244.

In certain embodiments, NID 200 can have one or more additional interfaces 256, 260 in communication with processing system 244 via transport media 264, 268, respectively. Additional interfaces 256, 260 can be adapted to communicate with any of a variety of internal transport media to send/receive telecommunication information to/from the customer premises. For instance, interface 256 can be a coaxial interface for connection to RG6 and/or RG59 cable, and interface 260 can be an RJ45 and/or RJ11 interface for connection to unshielded twisted pair cable (which can, for instance, form a 10Base-T Ethernet network).

In certain embodiments, NID 200 can comprise a line driver (not shown on FIG. 2A), coupled to processing system 244 and aggregator 240. The line driver can function to allow conversion between various network formats and media, allowing a variety of different media types (e.g., twisted pair and/or coaxial cable, in accordance with the HPNA and HPNA+ standards, as well, perhaps, as the customer premises' A/C wiring, in accordance, for example, with the HomePlug™ standard) to transport combined POTS and non-POTS information sets. If necessary, one or more different line drivers can be used to accommodate a variety of transport media.

The ability of NID 200 to support multiple interfaces of different types allows great flexibility in routing telecommunication information throughout the customer premises. Merely by way of example, if interface 228 receives telecommunication information that includes digitally-encoded video signals (e.g., MPEG-2 data), the information set that includes the encoded video signals can be routed by discrimination device 232 to processing system 244, which can decode the signals into an RF-modulated NTSC, HDTV and/or PAL format and transmit the signals via transport medium 264 to coaxial interface 256, where it can be transmitted via coaxial cable to one or more televisions at the customer premises. Alternatively, if the customer has a digital set-top box located at the television, the encoded signals can be routed by processing system 244 (perhaps through the appropriate line driver) to aggregator 240, where the signals can be transferred through interface 236 to the set-top box for decoding.

Similarly, in some embodiments, NID 200 might receive IP data (perhaps combined with other types of telecommunication information) on interface 228. The information set comprising the IP data can be routed by discrimination device 232 via medium 248 to processing system 244, where it can be processed, and depending on the embodiment, routed via transport medium 252 to the customer's existing telephone wiring (perhaps using interface 236, optionally in conjunction with aggregator 240 and/or one or more line drivers), routed to a 10Base-T network (perhaps transport medium 268 and interface 260), routed to a coaxial cable (e.g., using transport medium 264 and interface 256), or routed via a wireless interface (not shown in FIG. 2A). Alternatively, the IP data can be routed to any combination of these interfaces, and any of these interfaces could also receive IP or other telecommunication information from a CPE at the customer premises, for routing to processing system 244. In this way, NID 200 can allow virtually unlimited connectivity options for each CPE at the customer premises. Adding to the flexibility of NID 200, processing system 244 can include the necessary components to serve, for instance, as a cable, wireless, or xDSL modem, as well as components necessary to serve as an Ethernet hub, switch, router or gateway, the functions of each of which are familiar to those skilled in the art.

In certain embodiments, NID 200 can comprise a power supply 272 for providing electrical power to the components in NID 200. Power supply 272 can be powered through electrical current carried on one or more transport media and received on any of interfaces 228, 236, 256, 260. For example, those skilled in the art will recognize that a copper local loop could, in certain embodiments, transmit sufficient current to power NID 200 though interface 228. Further, a second local loop could be coupled to NID 200, perhaps through an additional interface, to provide additional current, if needed. Alternatively, power supply 272 could receive electrical current from a coaxial interface (e.g., 256), through a dedicated transformer plugged into an A/C outlet at customer premises, e.g., through D/C connection 276 (which can be 12V, for example, but can also provide any other amperage and/or voltage required by NID 200). In other embodiments, 12V connection 276 could be coupled to a CPE device and/or home fixture, which could provide power to the NID. Those skilled in the art will recognize as well that NID 200 could be coupled directly to an A/C power source (at any standard voltage). Processing system 244 can be powered by a connection 280 to power supply 272, some embodiments, processing system 244 might have its own power supply, which could include any of these powering options as well.

Figure 3:
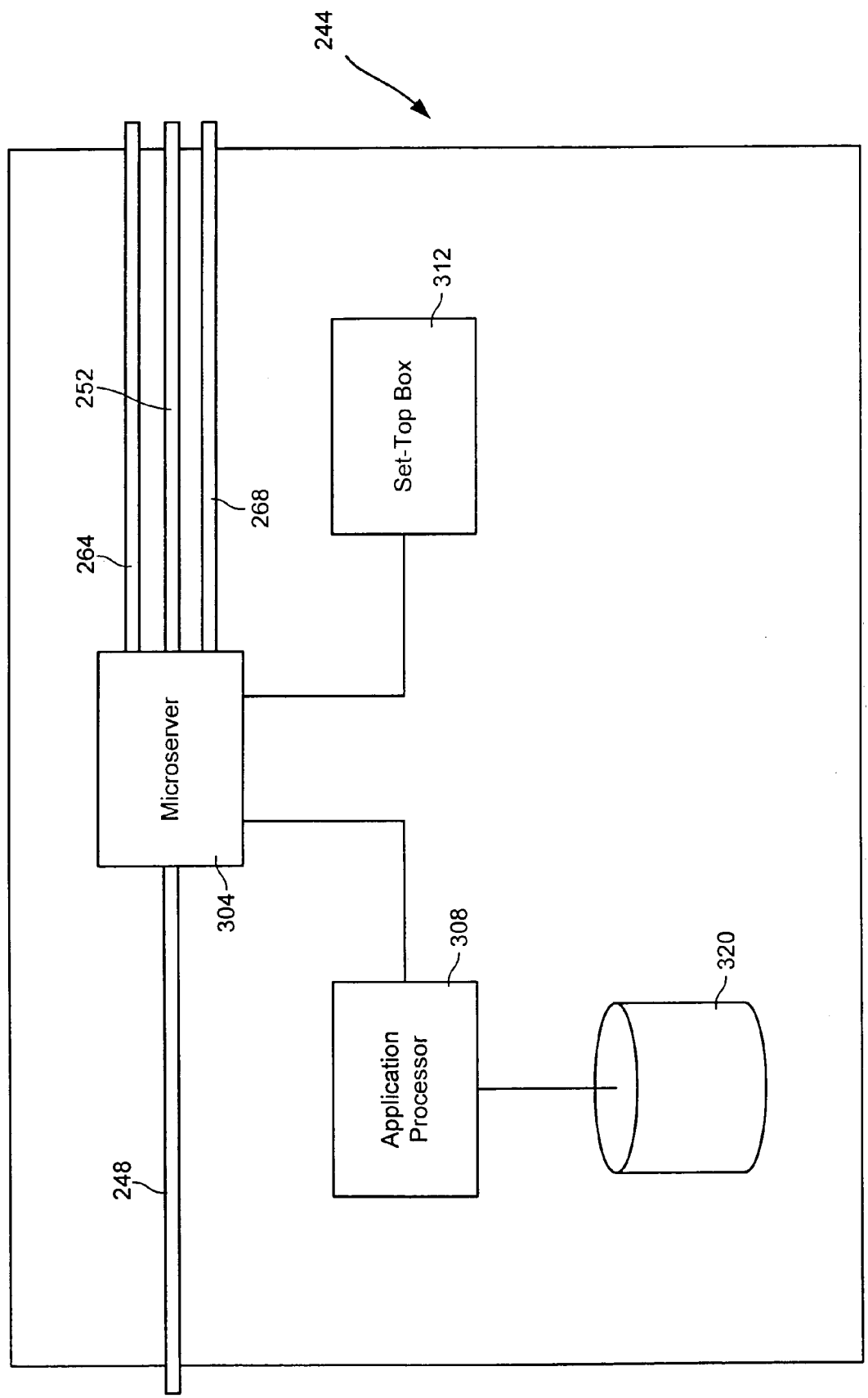
FIG. 3 is a schematic drawing illustrating a processing system that can be included in a network interface device according to certain embodiments of the invention.

As mentioned above, processing system 244 can comprise a plurality of processing devices, and each processing device can comprise multiple components, including microprocessors, memory devices, storage devices and the like. Merely by way of example, FIG. 3 provides a detailed illustration of exemplary processing system 244, which comprises multiple processing devices 304, 308, 312. In accordance with the exemplified embodiment, transport medium 248 links processing system 244 with an external transport medium (perhaps via a discrimination device and/or interface, as described above).

Transport medium 248 can be coupled to microserver 304, such that any information received by processing system 244 via transport medium 248 is first processed by microserver 304. Microserver can, in some embodiments, be the equivalent of a server computer, complete with memory devices, storage devices, and the like, each of which is known in the art and none of which is illustrated on FIG. 3. In certain embodiments, microserver 304 serves as the controller for the NID, overseeing the NID's configuration and monitoring performance; in some such embodiments, the controller functions can be accessed using a web browser. Depending on the embodiment, microserver 304 can be capable of performing a wide variety of additional functions, including functions related to administering any local area network comprised by the internal transport medium. For instance, microserver 304 can function as an xDSL modem in certain embodiments, allowing a home network attached to the NID to transmit and receive data via an xDSL connection to a telecommunication service provider. Microserver 304 can, in some cases, also function as a hub, bridge, switch or router.

Further examples of functions of microserver 304 in various embodiments include a dynamic host configuration protocol ("DHCP") server, which, as those skilled in the art will appreciate, allows for flexible configuration of an IP network using any internal transport medium attached to the NID, and a network address translation ("NAT") server, which provides some security against unauthorized use of the customer's network. Microserver 304 can also function as a HyperText Transport Protocol ("HTTP") server, which, among other benefits, can allow configuration of the NID through a convenient web interface, as well as a bridge, switch or router, which can be capable of supporting advanced routing techniques, such as MPLS and EFM, to name a few. Microserver 304 can function further to manage quality of service requirements, as described above.

In addition to these functions, microserver 304 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microserver 304 can serve a switching function somewhat similar to that described with respect to discrimination device 232 described in relation to FIG. 2A. For instance, if IP data is received by microserver 304, such data can be routed to an Ethernet connection, to the existing telephone wiring (e.g., in an HPNA implementation), or to any other appropriate medium (perhaps via an appropriate line driver). In fact, in certain embodiments, processing system 244 (and in particular microserver 304) can incorporate the functionality of discrimination device 232 and/or aggregator 240, rendering those components optional.

In addition to microserver 304, processing system 244 can include other components, including, for instance, application server 308 and set-top box 312, which, in the illustrated embodiment, are coupled to microserver 304. Application server 308 can comprise the equivalent of a computer, as described above, and thus can comprise one or more storage devices, such as hard disk drive 320, as well as memory devices, microprocessors and the like, to enable it to store and process telecommunication information and other data. In certain embodiments, application server 308 can perform tasks with processing, memory and/or storage requirements that render microserver 304 unsuitable, including a wide variety of consumer applications. For instance, application server 308 can act as a digital recorder for storing video (perhaps as a video-on-demand server or a personal video recorder), a file and/or application server for a home network attached to the NID, a Voice over IP ("VoIP") server, caller identification server, or voice gateway for a telephone system attached to the NID. Application server 308 can also function as a home security server, allowing the control of various features and configuration options for a home security system.

Set-top box 312, which, in some embodiments, can be coupled to microserver 304 as illustrated on FIG. 3, can provide traditional set-top box functionality (e.g., decoding of television signals, frequency switching, etc.), as well as provide enhanced features, including, for example, the provision of picture-in-picture signals for non picture-in-picture televisions, the provision of video on demand, personal video recorder features, and many other such features.

Processing system 244 can have multiple means of input and output. Merely by way of example, microserver 304 can communicate with one or more external transport media (perhaps, as discussed above, via intermediary devices) using one or more transport media (e.g., 248). Processing system 244 (and, specifically, microserver 304) also can communicate with one or more internal transport media (for example category 5, 5e and/or 6 unshielded twisted pair wire 268, RG6 and/or RG59 coaxial cable 264, and category 3 unshielded twisted pair copper (telephone) wire 252), again possibly via intermediary devices, as discussed with reference to FIG. 2A. Notably, some embodiments of processing system 244 can include interfaces for multiple transport media of a particular type, for instance, if processing system (and, in particular, microserver 304) serves as a networking hub, switch or router. Processing system 244 can also have infra-red and radio-frequency receivers and/or transmitters, for instance to allow use of a remote control device, as well as wireless transceivers, for instance to allow wireless (e.g., IEEE 802.11) networking.

As illustrated on FIG. 3, in some embodiments, microserver 304 manages the connections between application server 308, set-top box 312 and transport media 248, 252, 264, 268, routing data as necessary. In other embodiments, each processor 304, 308, 312 can have independent connections to one or more transport media.

It should be recognized that the devices within processing system 244 are described for illustrative purposes only. The functionality described above with respect to microserver 304, application server 308 and set-top box 312, respectively, each could be incorporated into a single device within processing system 244. Alternatively, their functions described herein could be divided among any number of processors and devices within processing system 244. Thus, the division of functions among devices within processing system 244 is discretionary and should not be considered to limit the scope of the invention.

Figure 4:
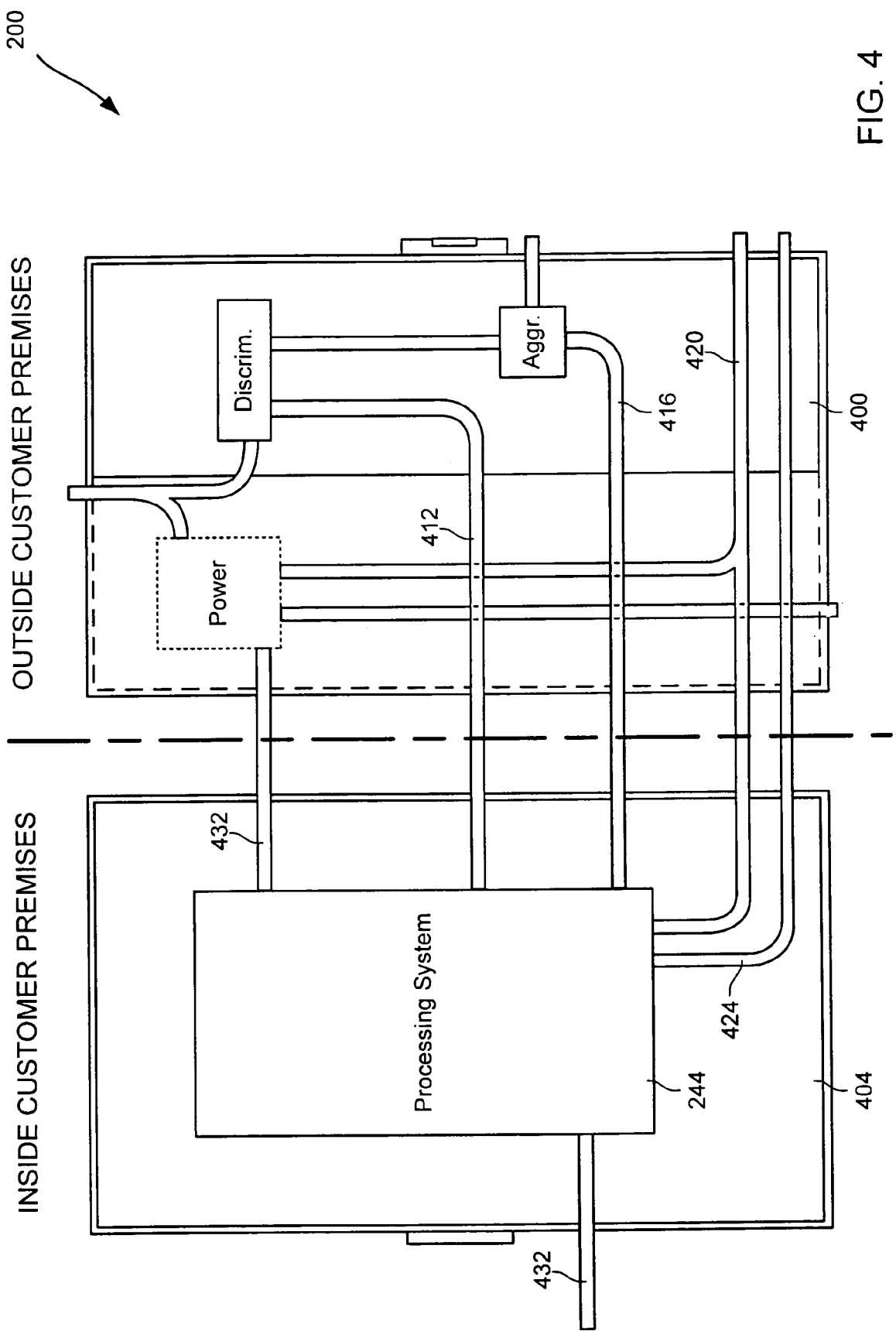
FIG. 4 illustrates a distributed network interface device according to certain embodiments of the invention.

In accordance with some embodiments, the NID might comprise multiple enclosures, each located in a different location and in communication with one another. Merely by way of example, FIG. 4 illustrates an alternative embodiment of the invention, including a NID 400 and a separate processing system 404. In the illustrated embodiment, NID 400 can include the features described above, except that processing system 404 can be located distal to NID 400. In this way, processing system 404 can be located in a more secure area (for instance, inside the customer premises), while NID 400 can be located conveniently at the exterior of the customer premises, where it can be accessed easily by service personnel. (Of course, it should be noted that a NID can also be hardened, so that it can be securely located in its entirety on the exterior of the customer premises, as, for instance, in the embodiments discussed above.) In some embodiments, processing system 404 can be in communication with NID 400 via similar transport media 412, 416, 420, 424 to those discussed with respect to FIG. 3 (248, 252, 264, 268, respectively) and can include all of the same functionality of the embodiments discussed above. As illustrated in FIG. 4, processing system 404 generally will draw power from its own source 428, although it could also be powered by NID 400, either via one of the transport media 412, 416, 420, 424 or through a separate power connection 432.

Figure 5:
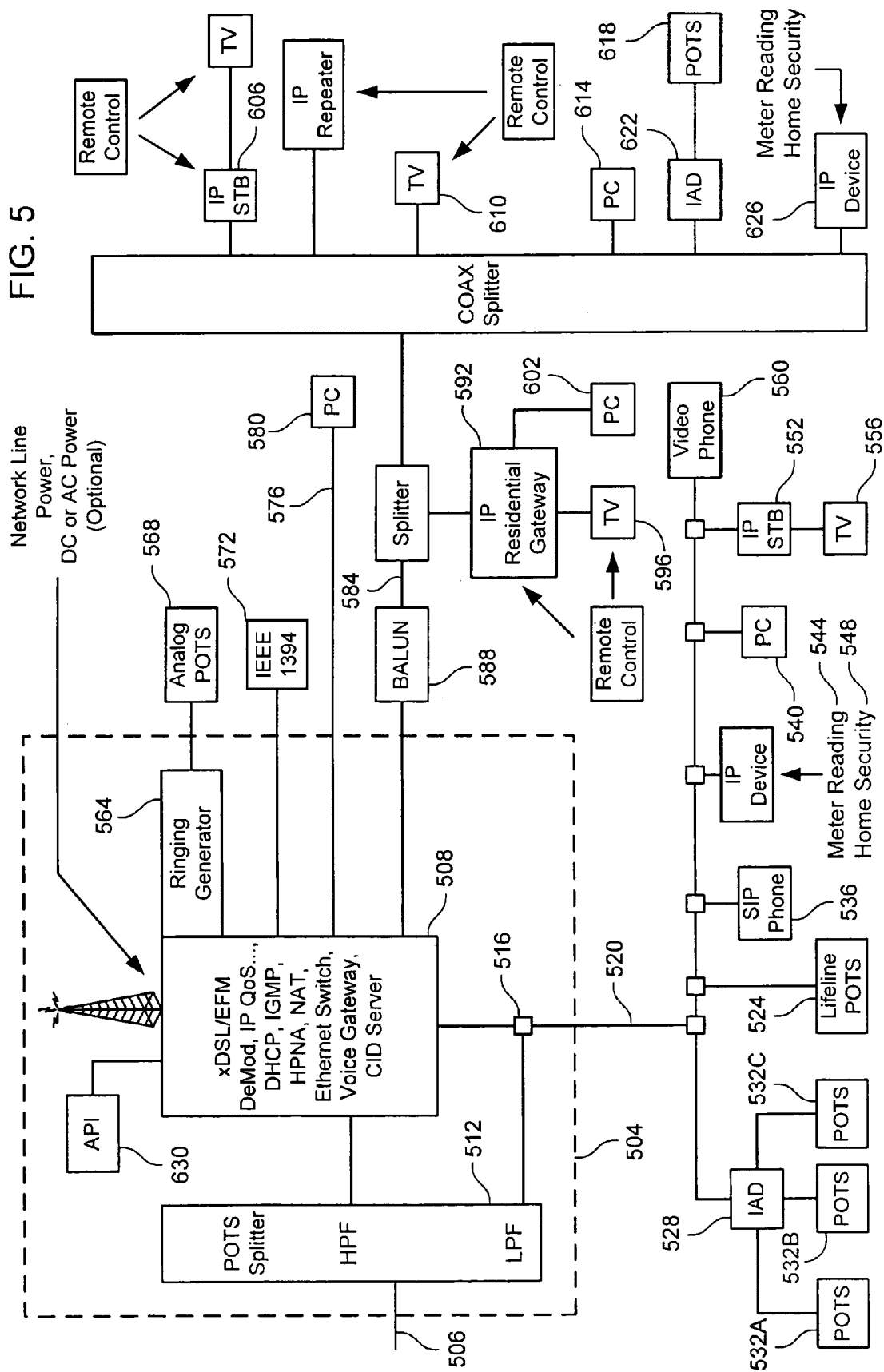
FIG. 5 illustrates a network interface device providing a variety of telecommunication services to a customer premises according to certain embodiments of the invention.

FIG. 5 illustrates an exemplary system 500 in which a NID 504 in accordance with certain embodiments of the invention is interconnected via several internal transport media to a wide variety of CPE, providing many different telecommunication services. NID 504 can be in communication with a telecommunication service provider's network via external transport medium 506, which can be any of the media described above; in this exemplary embodiment, it is a twisted pair copper "local loop," capable of carrying one or more POTS data sets and one or more xDSL information sets. NID 504 can have a processing system 508 in communication with discrimination device 512, which can be a combined high pass/low pass filter. As mentioned above, discrimination device 512 can function to separate POTS information sets from non-POTS information sets, with the former routed to aggregator 516, which can serve as an interface to a category 3 twisted pair internal transport medium 520. Processing system 508 can also be in communication with aggregator 516, so that non-POTS information sets may be transmitted using transport medium 520 as well.

Attached to internal transport medium 520 (which, in the illustrated embodiment can support the HPNA standard) can be a normal POTS telephone 524, along with an integrated access device, which, among other things, can provide POTS service via IP data transmitted via the HPNA network on internal transport medium 520. In the illustrated embodiment, three additional POTS telephones 532A, 532B, 532C are coupled to the integrated access device, although those skilled in the art will appreciate that certain embodiments will support different numbers and types of devices attached to the integrated access device. Also attached to transport medium 520 is a VoIP telephone 536, as well as a personal computer 540, which can use system 500 to access the Internet, among other things.

Further embodiments can include an IP-compatible utility meter 544, which can allow a utility provider such as a city water department or electrical utility to monitor and bill utility usage over the Internet or the telecommunication service provider's network, and/or an IP-compatible home security system 548, which can allow the customer to monitor and control home security functions remotely. Via an Internet connection to NID 504, a customer on vacation could administer home security system 548, view images from security cameras, check the status of any/all sensors, and even turn various lights in the house on and off.

Internal transport medium 520 can also be coupled to an IP-compatible set-top box 552, which may have a television 556 attached. In addition, certain embodiments allow for a video phone 560 to be included in system 500 and attached to medium 520. Processing system 504 can also support a digital-to-analog converter 564 (perhaps with a ring generator), to allow direct connection of a POTS phone 568 to the NID, perhaps for testing purposes or for mandated life-line service.

As mentioned above, NID 504 can support a variety of other interfaces and attachments as well. For example, in certain embodiments, NID 504 (and more precisely processing system 508) can comprise one or more fiber optic interfaces, including for example, IEEE 1394 interface 572, as well a variety of standard Ethernet connections, including for instance a category 5 10Base-T interface 576 that can be used, for example, to attach one or more personal computers (e.g., 580) to NID 504, as well as a wireless interface 578. Processing system 508 can also include a coaxial (RG6 and/or RG59) interface, either through use of a balun 588 (to convert, for example, from twisted pair to coaxial cable) or through a direct coaxial connection to processing system 508.

Like the other interfaces, coaxial interface 584 can support a wide variety of CPE and associated services, including transmission of both a video (e.g., HDTV, NTSC or PAL) information set and a data (e.g., IP data) information set, simultaneously. Supported devices can include an IP residential gateway, which can provide IP to HDTV/NTSC/PAL conversion for video display on a television 598, as well as direct IP connectivity, for example, to provide Internet access to a personal computer 602.

Through coaxial interface 584, NID 504 can also communicate with an IP-compatible set-top box, as well as directly with a cable-ready television 610, a personal computer 614 (either via a coaxial connection on the computer or through a balun), a POTS telephone 618 (for instance, through an integrated access device 622), or to any other IP-compatible device 626, such as a utility meter, home security system or the like. As discussed above, NID 504 can be programmable and/or addressable, and in some embodiments, NID 504 can include an application programming interface 630 to facilitate in the programming and/or addressing of NID 504.

Notably, different embodiments of the NID can provide several benefits, including simultaneous video, data and voice transmission, while optionally maintaining required QoS levels for each particular information set, as discussed above. Further, some embodiments of the NID can comprise a router that is capable of multi-protocol label switching ("MPLS"), which, those skilled in the art will recognize, allows the telecommunication service provider tremendous flexibility in designing the architecture of the external transport medium, including options, such as EFM and tag switching schemes (e.g., MPLS), that provide enhanced features and performance across the provider's network. Various embodiments of the NID also allow for a plurality of virtual private networks to be established through the NID, allowing one or more secure data connections from the customer premises to other locations.

Figure 6:
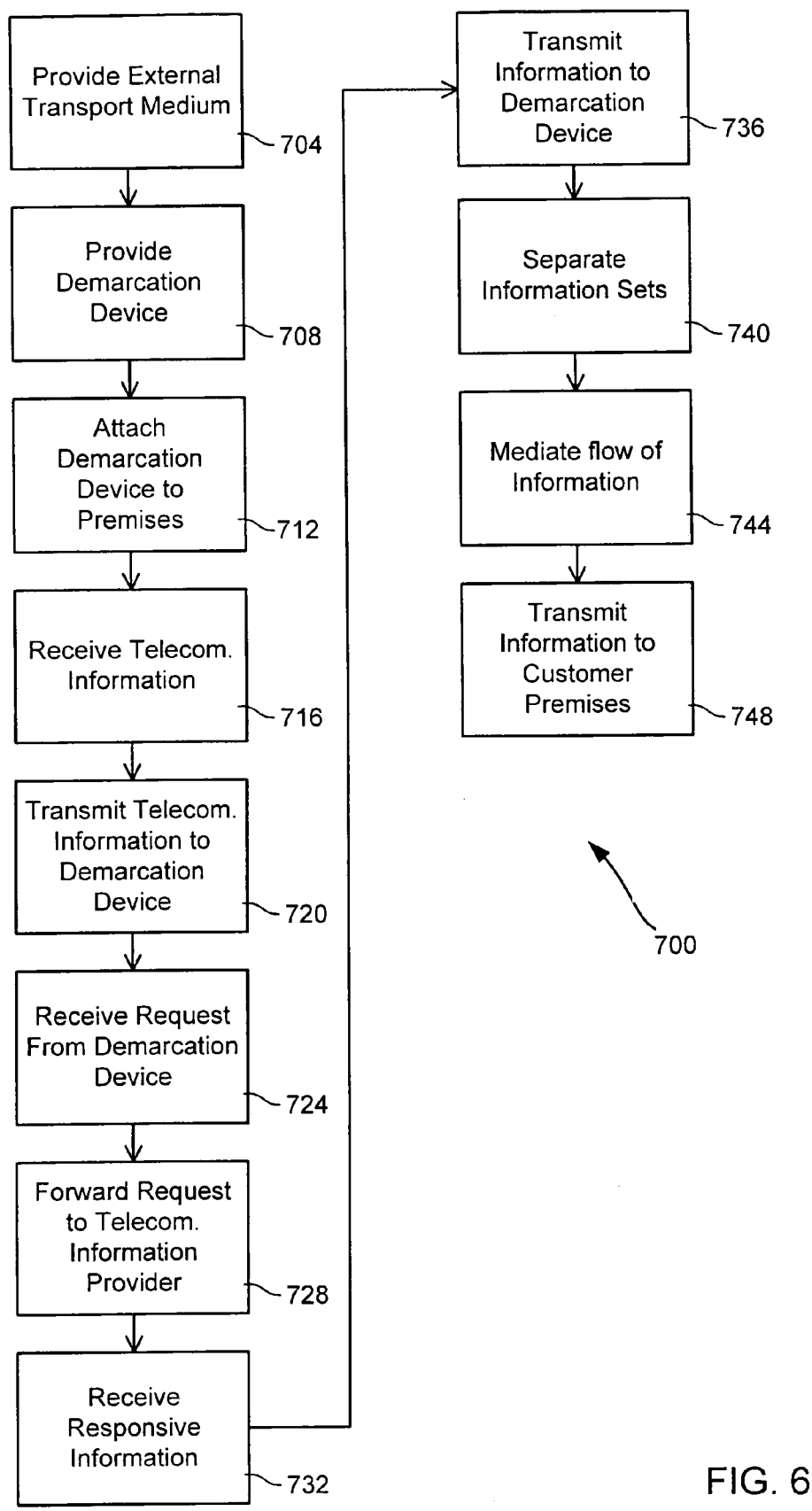
FIG. 6 illustrates a method of providing telecommunication services using a demarcation device, in accordance with certain embodiments of the invention.

Other embodiments of the present invention provide methods for using demarcation devices, and NIDs in particular. One exemplary method 700 in accordance with certain embodiments is illustrated on FIG. 6. It should be noted that the blocks displayed on FIG. 6 are arranged for ease of description only, and their order and arrangement should not be considered to limit the scope of the invention; hence, some of functions illustrated on FIG. 6 may be performed in an order different than that illustrated, or they may be omitted entirely.

In block 704, an external transport medium is provided. A wide variety of external transport media, including any of those discussed above, may be used without varying from the scope of this embodiment. At block 708, a demarcation device is provided. In a particular embodiment, the demarcation device can be a NID, as described above. In some embodiments, the demarcation device can be attached to an external wall of the customer premises (block 712), while in other embodiments, the demarcation device can be located elsewhere, including various locations at the customer premises (such as proximate to a particular CPE or coupled to an internal transport medium in an attic, garage, basement, crawl space or the like. In still other embodiments, the demarcation device could be co-located with a portion of the external transport medium, for instance in a digital loop carrier remote termination closet, at a DSLAM, or even at the distribution point.

In certain embodiments, a distribution point can receive telecommunication information from a telecommunication information provider or other source of telecommunication information (block 716). As discussed above, the telecommunication information can comprise a plurality of sets of telecommunication information, and each telecommunication information set can be associated with a particular telecommunication service. In many embodiments, the distribution point can receive the plurality of telecommunication information sets from a plurality of telecommunication information providers.

At block 720, the telecommunication information can be transmitted to the demarcation device through the external transport medium. Generally, the telecommunication information can be transmitted from the distribution point, although, as discussed above, the distribution point need be neither the ultimate source nor the ultimate destination of the telecommunication information. At block 724, the distribution point (or other facility) can receive a request, either for configuration information as discussed above, or for a particular telecommunication information set, and, in certain embodiments, the distribution point can forward that request to the appropriate telecommunication information provider (block 728). At block 732, the distribution point can receive information (e.g., telecommunication information, perhaps including configuration information) from the telecommunication information provider that is responsive to the request, and at block 736, that responsive information can be transmitted to the demarcation device, whether generated by the distribution point (and/or an associated control point) or the telecommunication information provider. In certain embodiments, different information sets can be received on different interfaces. Merely by way of example, a video information set could be received from a video source on one interface, while a data information set could be received from a data source on another interface. Alternatively, a plurality of information sets can be sent and/or received on a single interface.

At block 740, the demarcation device optionally can separate any telecommunication information received from the distribution point (whether or not sent in response to a request from the demarcation device) into discrete information sets, according to, inter alia, any of the criteria discussed above. Once the information sets have been separated, the demarcation device can take the appropriate action for each. Such actions can include processing the information set (perhaps with a processing system similar to that described above), transmitting the information set to a particular internal transport medium (see block 748 below), consolidating the information with one or more other information sets for combined transmission onto an internal transport medium, storing the information set (perhaps to a storage device, as discussed above), formatting one or more information sets (e.g., using a consolidated distribution protocol, as discussed below), and discarding the information set, among other things. Processing can additionally include encoding/decoding information (perhaps to/from a remote transmission protocol, discussed below).

At block 744, the demarcation device optionally can mediate the flow of telecommunication information between the internal transport medium and the external transport medium. This can be done in a variety of ways, including filtering the signals and/or frequencies sent from one transport medium to the other so as to diminish interference on one network by extraneous information, signals, and/or frequencies transmitted (intentionally or inadvertently) by the other. Mediating the flow of information can also include filtering the information sent through the demarcation device, such that particular telecommunication information (and/or information sets) can be treated differently from other information (and/or information sets). In some embodiments, mediating the flow of information can be considered part of the processing procedure, while in other embodiments, mediating the flow of information can be a separate procedure. For instance, as discussed above, a given information set can be processed, routed or stored differently than other sets.

At block 728, the telecommunication information (or a particular set thereof) can be transmitted to the customer premises by the demarcation device. Those skilled in the art will appreciate that, that while for ease of description, method 700 has been described with respect to unidirectional information flow (from a distribution point to a customer premises), certain embodiments of the invention easily can accommodate information flow in the opposite direction, as well as bi-directional information flow. Thus, information also could be transmitted from a CPE, through the internal transport medium, to the demarcation device. The demarcation device then could separate that telecommunication information into information sets, if necessary, and take any of a variety of actions (including those discussed above) with respect to each information set, including transmitting the information in the information set to the distribution point via the external medium.

Likewise, methods in accordance with certain embodiments of the invention can support the transmission of telecommunication information from a CPE, through a demarcation device, to a distribution point, and, ultimately to a telecommunication information provider. For instance, at block 752, the demarcation device can receive telecommunication information from the customer premises, and at block 756, this and other information (such as, for instance, information generated by the demarcation device itself, including configuration information, service requests and the like) can be transmitted to a telecommunication service provider (and/or a telecommunication information provider). Merely by way of example, the telecommunication information received from the customer premises and/or transmitted to the telecommunication service provider can include video information, IP data, telephony information and the like, as well as information related to providing telecommunication services, such as the video provision information discussed below, information related to data transmission services, telephony signaling information, and the like.

Further, methods according to other embodiments allow for simultaneous and/or near simultaneous two-way transmission of telecommunication. Information can be transmitted to and/or received from, the customer premises on one or more interfaces, which can be in communication with one or more internal transport media, as discussed in detail herein.

Figure 7:
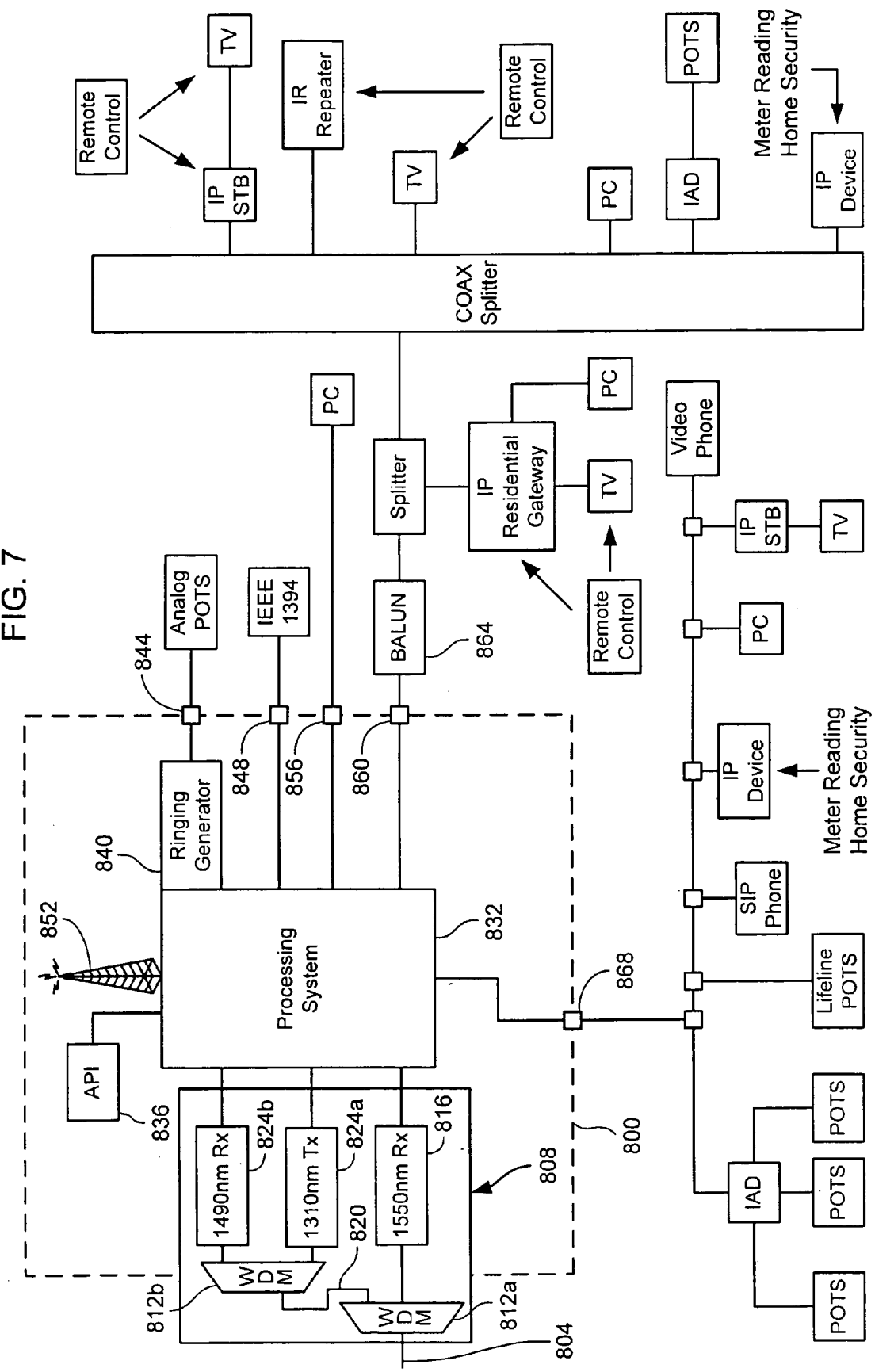
FIG. 7 is a conceptual drawing of a network interface device that can be coupled to a fiber optic cable and used to provide telecommunication services, in accordance with certain embodiments of the invention.

As mentioned above, demarcation devices can accommodate a variety of different types of external and internal transport media. For instance, FIG. 7 depicts a conceptual drawing of a NID 800 in accordance with particular embodiments. NID 800 can be in communication with a fiber-optic external transport medium 804. Fiber cable 804 can be any of a variety of optical fiber media, including those discussed above. In certain embodiments, fiber cable 804 can be single-stranded, such that two-way communication can be provided on the same strand (using any of a variety of methods known in the art, for example, wave-division multiplexing and/or time-division multiplexing). In other embodiments, fiber cable 804 can be multi-stranded, and each strand optionally can carry communication in a single direction, such that, for instance, two way communication between demarcation device 800 and a distribution point (not shown in FIG. 7) can be accomplished with two strands of fiber. Multi-stranded fiber can, of course, implement one or more multiplexing schemes as well.

In the illustrated embodiment, NID 800 comprises a first interface 808 that can be in communication with fiber cable 804. In accordance with certain embodiments, first interface 808 can include one or more multiplexers 812a, 812b. Multiplexers 812 can implement any multiplexing scheme know to those skilled in the art, including those multiplexing schemes discussed above. In this way, for instance, a single NID can support transmission of a plurality of information sets via a single fiber cable 804, perhaps from plurality of telecommunication information providers and/or telecommunication service providers.

For instance, in some embodiments, fiber optic cable 804 can transport both video (digital or analog) and data information sets. Merely by way of example, in the illustrated embodiment, video information can be transmitted from a distribution point at a frequency of 1550 nm, while data can be transmitted at lower frequencies. Thus, multiplexer 812a can separate the higher frequency video information from the rest of the transmission and can route the video information via transport medium 816. Conversely, NID 800 can route the lower frequency data information via transport medium 820, which can be in communication with multiplexer 812b. In some embodiments, multiplexer 812b can be used to aggregate and/or separate incoming and outgoing signals, for instance those on transport media 824a and 824b, respectively, according to light frequency. In other embodiments, a single transport medium 824 could transport two-way data communications; multiplexer 812b thus can be optional.

First interface 808 can be in communication (perhaps via transport media 816, 820, 824) with a processing system 832. In some aspects, media 816, 820, 824 can be optical media and processing system 832 can incorporate an electro-optical transducer. In other embodiments, however, first interface 808 may comprise one or more electro-optical transducers and one or more of media 816, 820, 824 can be electrical media (e.g., twisted pair wiring). In addition to electro-optical conversion, processing system 832 can perform any of the functions of the processing systems discussed above, and can include similar components to those discussed above (which are not shown here merely for the sake of brevity). For instance, processing system 832 can include an API 836 to allow the reception of configuration information.

In some aspects, life-line POTS service can be provided by NID 800 using fiber cable 804. In such embodiments, NID 800 may comprise a ringing generator 840, which can be coupled to processing system 832 and in communication with an analog telephone 844. In other embodiments, NID 800 may also include an interface for connecting with a second external medium, perhaps a twisted pair local loop, which could provide analog POTS service, and NID 800 could pass through the POTS signal from that second external medium, allowing connection of an analog telephone to NID 800. NID 800 can also accommodate any of the interfaces discussed above, including, for instance, an IEEE 1394 interface 848, a wireless interface (e.g. 802.11, LMDS, etc.) 852, an Ethernet interface 856, and a coaxial interface 860. NID 800 can also comprise a twisted pair interface 868, which can, in some embodiments, allow NID 800 to provide telecommunication services via the existing telephone wiring at customer premises. These and other interfaces can allow NID 800 to be in communication with a variety of CPE devices as shown on FIG. 7, all of which are described elsewhere and need not be described here. Optionally, any of these interfaces may incorporate a balun (e.g. 864) or line driver, as discussed herein.

Figure 8:
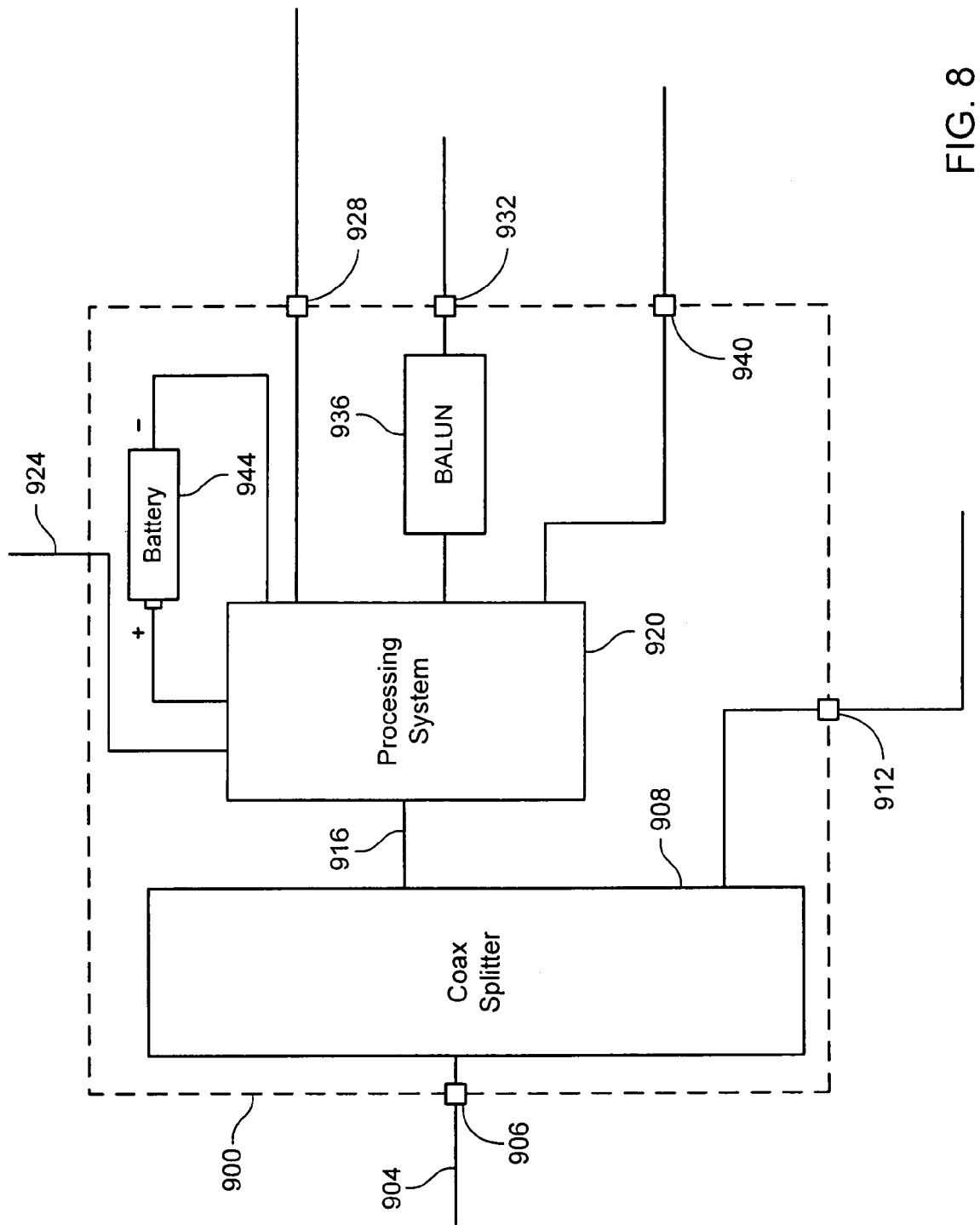
FIG. 8 is a conceptual drawing of a network interface device that can be coupled to a coaxial cable and used to provide telecommunication services, in accordance with certain embodiments of the invention.

In accordance with other embodiments of the invention, NIDs are provided for communicating with coaxial external media, as for instance, are used by cable television providers. Merely by way of example, FIG. 8 illustrates one such embodiment, comprising a NID 900 that can be in communication with a coaxial cable 904. In some embodiments, coaxial cable 904 can transport a plurality of information sets corresponding to one or more telecommunication services, including, for instance, analog video and/or data. In some such embodiments, NID 900 can include an interface 906 that can be coupled to cable 904. Interface 906 can also be coupled to a coaxial separator/aggregator 908 which can separate signals (perhaps according to frequency and/or time-division multiplexing) and, optionally, aggregate signals as well. Thus, for instance, analog video signals may be transmitted from a service provider on a particular frequency and separator/aggregator 908 can separate those signals and route them via transport medium 912. In certain embodiments, separator/aggregator 908 can also route data signals via transport medium 916, perhaps to processing system 920.

Processing system 920 can be in communication with a customer premises via any of the variety of internal transport media and/or interfaces discussed herein, including by way of example an Ethernet interface 928, a coaxial interface 932 (perhaps including a balun 936), and/or a twisted pair interface 940, which in some embodiments can communicate with the existing telephone wiring of the customer premises, perhaps using a line-sharing protocol such as HPNA, HPNA+, Home Plug and/or the like. Similar to other embodiments discussed above, NID 900 can include an optional AC or DC power source 924 and can further comprise a battery 944. In many embodiments, battery 944 can provide back-up power in case of a power failure.

As noted above, NIDs in accordance with certain embodiments can include interfaces for any of a variety of different external and/or internal transport media known in the art, and in some embodiments, a single NID can be coupled to multiple external and/or internal transport media, allowing a wide variety of telecommunication options for a particular customer premises. Particular embodiments of such NIDs can in one aspect be considered "integrated" NIDs because they are capable of supporting a plurality of different external media types. Advantageously, in accordance with certain embodiments, telecommunication information from any combination of these media can be managed and transmitted throughout a customer premises, all via single NID, if desired.

Figure 9:
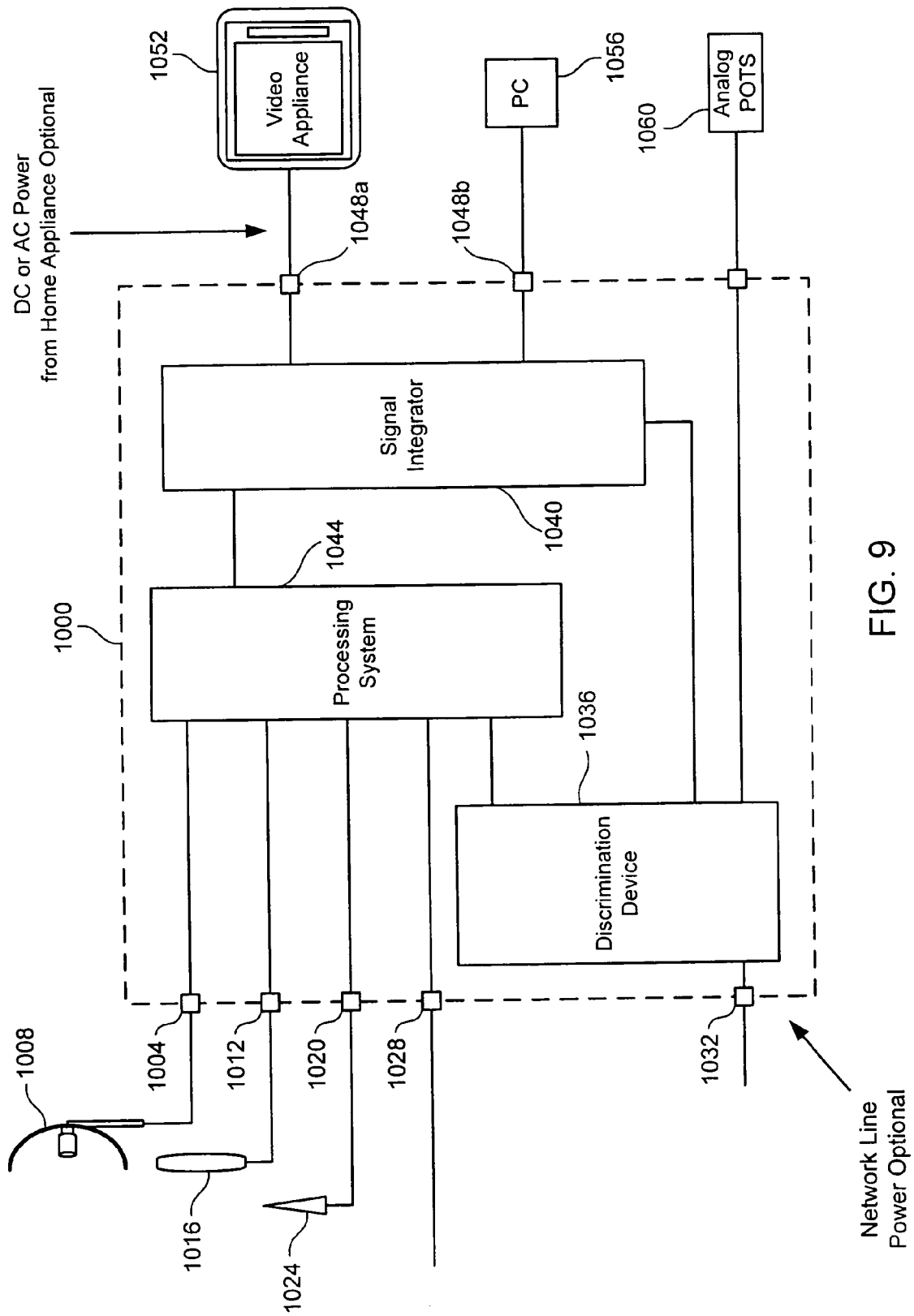
FIG. 9 is a conceptual drawing of a network interface device that can be coupled to a variety of different external transport media and used to provide telecommunication services, in accordance with certain embodiments of the invention.

To illustrate these and other benefits, FIG. 9 provides a conceptual drawing of one exemplary integrated NID 1000, which can be in communication with a variety of transport media. For instance, NID 1000 can include an interface 1004 for communicating with a digital broadcast satellite receiver and/or transceiver (e.g., a satellite dish) 1008, an interface 1012 for communicating with a wireless transceiver (e.g., an antenna capable of transmitting and/or receiving any of the wireless transmissions discussed herein, including "WiFi" signals familiar to those skilled in the art) 1016 and an interface 1020 for communicating with a microwave transceiver (e.g., an LMDS and/or MMDS transceiver) 1024. NID 1000 can further include an interface 1028 to be in communication with a coaxial cable (for instance, to communicate with a cable television or broadband provider). Other interfaces (for instance, any of the fiber interfaces discussed above), can be implemented as well.

NID 1000 optionally can include an interface 1032 adapted to be coupled to a twisted pair copper transport medium, which can be, for instance, a telecommunication service provider's local loop. Interface 1032 can also be coupled to a discrimination device 1036, the nature and functions of which are described in detail elsewhere in this disclosure. Discrimination device 1036 can be used to transmit (and/or receive) analog POTS signals to/from a traditional telephone, and (optionally) can be in communication with an aggregator 1040, which, as discussed in detail above, can consolidate a variety of analog and/or digital information sets for transmission throughout the customer premises.

Discrimination device 1036, as well as interfaces 1004, 1012, 1020, 1028, can be in communication with a processing system 1044, which can include a variety of components, including those described above, and can perform any of the functions described above, such as routing, mediation, processing and the like, especially with respect to digital information sets. In certain embodiments, processing system 1044 can serve as a signal integrator to combine all of the signals received from interfaces 1004, 1012, 1020, 1028 and discrimination device 1036 (and, as those skilled in the art will recognize, route signals traveling in the opposite direction to the proper external transport medium). In other embodiments, each interface 1004, 1012, 1020, 1028 and/or discrimination device 1036 can be coupled to a plurality of discrete processing systems, which in turn can be coupled to a separate signal integrator, such as one described in detail below. Optionally, processing system 1044 can be coupled to an aggregator 1040, which can, inter alia, combine disparate information sets, perhaps received on different interfaces, for combined transmission to the customer premises. (Alternately, processing system 1044 could be directly coupled to one or more internal interfaces for transmission of information to the customer premises.)

As discussed above, in one aspect, aggregator 1040 can be used to combine digital and analog information sets (for instance, a POTS information set from discrimination device 1036 and an IP information set from processing system 1044), as well as filter information sets traveling in the opposite direction for routing to the correct component and/or interface. In some aspects, aggregator 1040 can be configured to format one or more information sets according to desired protocols, including Ethernet, HPNA, HPNA+, and/or HomePlug, before and/or after combining information sets for transmission, as well as to convert from such formats when receiving information from the customer premises. Alternatively, processing system 1044 can be configured to perform any and/or all of the functions of aggregator 1040.

Aggregator 1040 can be in communication with one or more internal interfaces (e.g., 1048a, 1048b), which, as discussed above, can provide facilities for communication with any of a variety of internal transport media, perhaps through a balun or line driver. In the illustrated example, interface 1048a can be a coaxial (e.g., RG6 and/or RG59) cable interface, and interface 1048b can be a twisted pair (e.g., category 3, category 5, category 6, category 7, etc.) interface, perhaps for connection to the existing telephone wiring at customer premises. Similarly, NID 1000 can be in communication with any of a variety of CPE devices and/or home fixtures (e.g., 1052, 1056, 1060), including those discussed above, and can be configurable and/or addressable.

In certain embodiments, each of the external transport media can be associated with the same telecommunication service provider and/or telecommunication information provider. In other embodiments, one or more of the external transport media can be associated with different telecommunication service providers and/or telecommunication information providers. Moreover, those skilled in the art will recognize that, while FIG. 9 provides some exemplary interfaces for communication with a variety of disparate external transport media, other embodiments need not include each of the illustrated interfaces. Indeed, certain embodiments may include a plurality of similar interfaces (for instance, multiple twisted-pair interfaces and/or fiber interfaces), and other embodiments can include interfaces not shown on FIG. 9, such as fiber interfaces, PCS interfaces, and/or the like.

Still other embodiments may include one or more of the interfaces illustrated on FIG. 9 and/or various combinations of those interfaces. Merely by way of example, NIDs in accordance with certain embodiments are capable of receiving telecommunication information via one or more digital broadcast satellite ("DBS") receivers, and, optionally, from other sources as well. Those skilled in the art will recognize that DBS receivers, commonly known as "satellite dishes," often can allow reception of video and data signals from one or more geosynchronous satellite systems, such as those operated by EchoStar Communications Corp. and Hughes Electronics Corp., among others, and can therefore be considered video sources, as well as sources of other telecommunication information, such as data, voice, audio, and the like. Those skilled in the art will also recognize that a satellite dish could, in some embodiments, also act as a transmitter, allowing "upstream" transmission of telecommunication information to a telecommunication service provider. Similar receivers (which also can be integrated into various embodiments of the invention) can allow transmission and/or reception of signals via point-to-point microwave transmissions. Those skilled in the art will recognize as well that any other video source (such as cable television transmissions, off-air antennas, and/or the like) could be incorporated into similar embodiments.

Those skilled in the art will appreciate that NIDs configured to be used with DBS receivers (as well as other video sources) offer many features and advantages. Merely by way of example, some embodiments allow for the transmission of video signals throughout a customer premises without the need to run dedicated coaxial cable to the satellite receiver from each of a plurality of television locations. Instead, by using a NID, received video information can be consolidated and (if desired) converted at the NID and transmitted to any location served by any suitable internal transport media. The transmitted video information can be formatted in any of a variety of ways (including without limitation those mentioned above), such as, for instance, HDTV signals, NTSC signals and MPEG (including MPEG2 and/or MPEG4) signals, and they can be transmitted in analog or digital forms (for instance, as encapsulated in IP packets and/or HPNA frames). Further, in accordance with certain embodiments, NIDs capable of accepting video information can also accept other types of telecommunication information (e.g., voice, data, etc.), either from the same source or from a different source.

Depending on the embodiment, certain equipment can be located proximate to each video appliance (e.g., television, computer monitor, etc.) that is intended to receive video signals from the NID. For instance, with respect to video appliances that do not include digital tuners, a set-top box could be used to facilitate the transmission of digital video signals. (Alternatively, RF-modulated analog signals could be sent to the video appliance.) In other embodiments, a set-top box or other device (including even a video appliance itself) can be used to relay configuration information to the NID; such configuration information can include, inter alia, request to change video channels and/or the like. Further, an infra-red receiver (perhaps incorporated in a set top box) could receive signals from a remote control device at the location of a particular video appliance and relay those signals (using any internal transport medium, including the medium carrying the video signals and/or ultra high frequency ("UHF") carrier waves, to name but two). Alternatively, a remote control device could communicate directly (via UHF, infra-red, etc.) with NID 1000.

Figure 10:
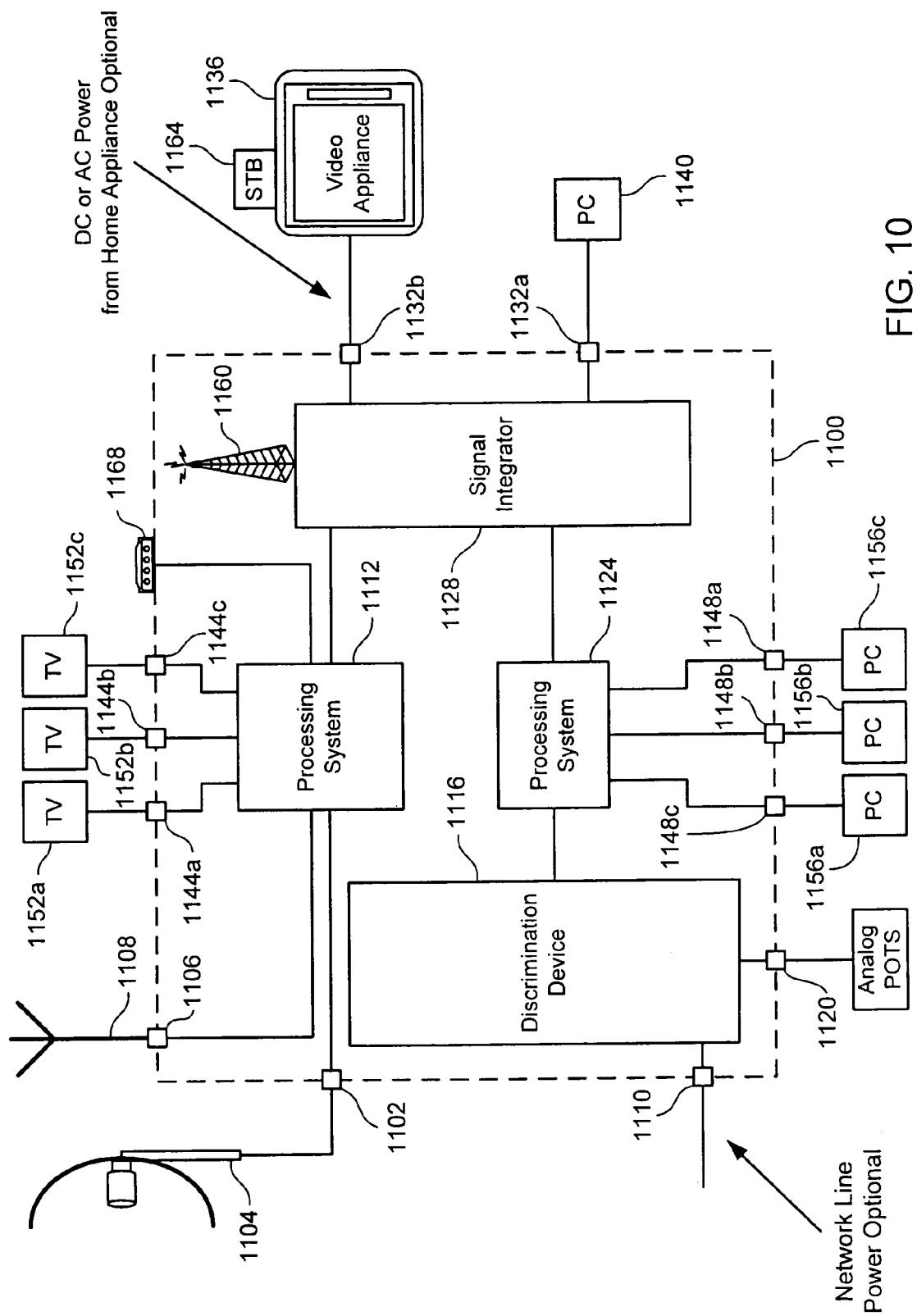
FIG. 10 is a conceptual drawing of a network interface device that can provide video and data services to a customer premises, in accordance with certain embodiments of the invention.

FIG. 10 illustrates a NID 1100 in accordance with certain embodiments of the invention. NID 1100 can include an interface 1102 for communicating with a video source, which in the illustrated embodiment is depicted by a satellite receiver 1104, but could also be any of the video sources disclosed herein. More generally, a video source can also be considered to include any transmission received by satellite receiver 1104 and/or other video signals received by NID 1000 via an external transport medium. In many cases, interface 1102 can comprise a plurality of interfaces and/or can be in communication with a variety of video sources.

For instance, those skilled in the art will recognize that, in some DBS implementations, a customer premises with multiple video appliances will require a plurality of connections to receiver 1104 (e.g., a plurality of discrete connections to a multiple low noise-block ("LNB") converters) to provide multiple video feeds to the video appliances. Interface 1104 can accommodate as many such connections as necessary. Further, NID 1100 can include an additional interface 1106 that can be coupled to an off-air antenna (either analog or digital, including HDTV) 1108, CATV connection, and/or the like. In certain embodiments, interface 1102 and 1106 can be the same interface, while in other embodiments, additional interfaces can communicate with additional video sources.

NID 1100 optionally can include other interfaces (e.g., 1110) for communicating with a additional external transport media (which could include, merely by way of example, a twisted-pair local loop, which might carry xDSL telecommunication information, a fiber link, a coaxial cable, a wireless link, and/or the like), allowing NID 1100 to provide telecommunication services via a variety of different external media. In some aspects, interface 1110 could be considered to be in communication with a data source (e.g., a source and/or recipient of IP or other data), although, depending on the embodiment, interface 1110 could be capable of receiving any type of telecommunication information and should not be interpreted as limited to receiving data. A data source can include any external transport medium in communication with NID 1100, as well as any transmission of data via such a medium.

Interface 1104 can be in communication with a processing system 1112, which can include any of the components discussed above, and, also as discussed above, can process received information in any of a variety of ways, including without limitation translating, decoding, encoding, converting, reformatting and/or otherwise processing information received on interface 1104. In embodiments comprising more than one video interface (e.g., 1102, 1106), processing system 1112 can serve as a signal integrator for combining the video information received on each interface. (Alternatively, a separate signal integrator can be coupled to interfaces 1102, 1106 and configured to combine the signals before transmission to processing system 1112 and/or directly to an interface for communicating with the customer premises).

Other examples of processing tasks that can be performed by processing system 1112 include protocol formatting and/or conversion. For instance, those skilled in the art will recognize that DBS systems often format video information digitally for transmission (e.g., using one or more of the MPEG digital encoding algorithms). Often this digital video information is further encoded and/or-encapsulated before transmission, using any of a variety of encoding algorithms, which can, in some cases, be used to allow transmission of digital information on an analog carrier medium Such algorithms are referred to herein generally as "remote transmission algorithms." One example of such an algorithm is phase shift keying, and in particular quadrature phase shift keying ("QPSK"), an algorithm well known in the art and used in the transmission of digital information. Other examples could include frequency shift keying ("FSK"), quaternary amplitude modulation ("QAM"), and the like.

Processing system 1112, in certain embodiments, can comprise a processing device (for instance, a digital signal processor) operable to decode a signal encoded by a remote transmission algorithm, producing digitally-formatted video information, for instance, MPEG2 data and/or HDTV signals. If desired, processing system 1104 further can convert the digitally-formatted information to produce analog video signals, for instance NTSC and/or PAL signals, and/or can serve as an RF modulator to enable the transmission of a plurality of such signals on a single medium. In certain embodiments, processing system 1112 can comprise a first processing device for decoding a remote transmission algorithm and a second processing device for translating the resulting digital information to a different format (which can be either digital or analog).

Merely by way of example, the first processing device can decode a QPSK-encoded signal received from a DBS satellite via receiver 1008, perhaps producing an MPEG2 video feed. The second processing device can convert the MPEG2 feed into an NTSC signal for transmission to a television and/or re-encapsulate the MPEG2 feed (perhaps into IP packets and/or with a consolidated distribution protocol, for example). In certain respects, therefore, these processing devices can be considered to comprise one or more "translation devices," the purpose of which is to provide decoding/encoding, reformatting and/or translation of various telecommunication protocols and encoding schemes. Translation devices, therefore, can comprise processors (including digital signal processors), memory and/or buffer devices analog/digital converters (and/or digital/analog converters), digital and/or analog signal amplifiers/repeaters, RF modulators/demodulators, and the like.

As noted above, certain embodiments of NID 1100 can include a second interface 1110 for receiving/transmitting additional telecommunication information, e.g., data, perhaps from a provider's "local loop" wiring to the customer premises. In some such embodiments, interface 1110 can be coupled to a discrimination device 1116, the nature and functions of which have been discussed elsewhere in this disclosure. In one aspect, therefore, NID 1100 can be configured to transmit/receive, for instance, a combined signal (i.e., a transmission that includes multiple information sets) on interface 1110, and discrimination device 1116 can be configured to separate POTS information in the signal from non-POTS (e.g., xDSL) information (and, of course, to combine information sets for transmission to the external transmission medium). POTS information can be routed to an analog interface 1120, which can, in some embodiments, be adapted to be in communication with one or more analog telephones.

Discrimination device 1116 can also be coupled to a second processing system 1124, which can be used to process any non-POTS information (e.g., video, data, etc.) that travels though discrimination device 1116. (As disclosed above, in other embodiments, a single processing system could provide the functionality of the two illustrated processing systems 1112, 1124). In certain embodiments, processing system 1124 can, inter alia, translate xDSL information to, for instance, IP data and/or format that data into a consolidated distribution protocol for transmission on a shared medium to the customer premises. Thus, processing system 1124 can also incorporate one or more translation devices, which are described above. Processing systems 1112, 1124 can be coupled to a signal integrator 1128, which can combine information sets (in this case, for example, from each processing system 1112, 1124), e.g, for transmission to the customer premises or for consolidated processing, and/or split a consolidated information set (e.g., an information set received from the customer premises) into one or more information sets for transmission to the appropriate processing system, external interface, etc. In some embodiments, signal integrator 1128 can provide conversion to/from a consolidated distribution protocol. In other embodiments, one or more of processing systems 1112, 1124 can incorporate the functionality of signal integrator 1128, and processing systems 1112, 1124 can be coupled to each other. Signal integrator 1128 can also incorporate the functionality of an aggregator, discussed elsewhere in this disclosure.

In further embodiments, discrimination device 1116 can also be coupled to signal integrator 1128, which can incorporate the functionality of an aggregator, described above. In this way, POTS information and non-POTS information (including, for instance, any combination of video, data and audio information) can be distributed to the customer premises on a common transport medium, perhaps formatted according to a consolidated distribution protocol. Signal integrator 1128 can be coupled to a plurality of interfaces (e.g., 1132a, 1132b), which can provide connectivity to a variety of different internal transport media, for communication to any of a variety of CPE and/or home fixtures (illustrated by video appliance 1136 and PC 1140). Merely by way of example, interface 1132a can be a twisted pair (e.g., RJ11) interface, and interface 1132b can be a coaxial (e.g., RG 6, RG59) interface.

Moreover, processing systems 1112, 1124 can also be coupled to dedicated interfaces 1144, 1148. In this way, for instance, processing system 1112 can transmit/receive particular information (e.g., analog and/or digital video) on one or more interfaces 1144, and processing system 1124 can transmit a particular information set (e.g., IP data) on one or more interfaces 1148. In these and other ways, NID 1100 can be used (if desired) to transmit different information sets on different transport media, either in conjunction with or as an alternative to transporting a plurality of information sets on a shared internal medium, as detailed above. Merely by way of example, interfaces 1144a, 1144b, 1144c can be coupled to video appliances 1152a, 1152b, 1152c, respectively. Similarly, interfaces 1148a, 1148b, 1148c can be in communication with computers 1156a, 1156b, 1156c, respectively. In this way NID 1100 (and/or, in some cases, processing systems 1112 and/or 1124) can serve as, for instance, an Ethernet hub and/or an analog/digital video distribution hub for a customer premises wired using a star topology.

In addition, signal integrator 1128 can include one or more wireless interfaces (e.g., 1160), which can be used to transmit/receive telecommunication information via any of the wireless protocols discussed above. Wireless interface 1160 can be used, for instance, to receive configuration information from one or more devices (e.g., set-top box 1164 and/or a remote control device) inside and/or outside the customer premises and can be coupled to any appropriate device in NID 1100, including without limitation signal integrator 1128 (e.g., as illustrated in FIG. 10), processing system 1112 and/or processing system 1124. The configuration information can include, for instance, instructions to switch video feeds (e.g., change the channel) for the video appliance. The configuration information can be relayed (if necessary) from signal integrator 1128 to processing system 1112, where the desired action can be taken. In this and other ways, a wide variety the functions and/or features of NID 1100 (including those described above) can be configured from set-top box 1148 (and/or a remote control device in communication with set-top box 1148), and set-top box can be considered a control point. Alternatively, in certain embodiments, a PC 1140 in communication with NID 1100 can provide similar configuration information, perhaps through a web browser or via dedicated software on the PC communicating with NID 1100 through an API, and PC 1140 also can be considered a control point. Although not shown on the illustrated embodiment, NID 11 can be powered via any of the mechanisms discussed elsewhere in this disclosure.

In certain embodiments, a NID can include one or more diagnostic indicators, which can provide visual information on the functions and/or performance of the NID. Merely by way of example, NID 1100 includes a signal strength meter 1168 coupled to processing system 1112. Signal strength meter 1168, which can be an analog gauge, LED display and/or the like, can be used to determine the strength of one or more video signals received by NID 1100 and can be used both for troubleshooting purposes and configuration (e.g., tuning of receiver 1104 and/or antenna 1108). It should be appreciated that, while for purposes of illustration, meter 1168 is coupled to processing system 1112 and used to display video signal strength information, other embodiments can include a wide variety of diagnostic indicators, including network activity indicators, power indicators (including battery backup and/or power failure indicators), security indicators, and the like, and such indicators can be in communication with any appropriate component of NID 1100, including without limitation processing systems 1112, 1124, signal integrator 1128, discrimination device 1116, and/or any of the interfaces 1102, 1106, 1110, 1120, 1132, 1144, 1156, 1160. Moreover, any of the information available via such diagnostic indicators can also be made available digitally, such as perhaps via a configuration API, which is discussed elsewhere in this disclosure.

Those skilled-in the art will appreciate, based on the disclosure herein, that NID 1100 can provide a robust platform for the transmission of a variety of telecommunication information, including without limitation, voice, data, audio and video information. For instance, with respect to video distribution, NID 1100 can distribute analog and/or digital signals using a variety of interfaces and/or protocols, as discussed above. For instance, video information can be transmitted as IP data using, e.g., interface 1132*b,* and set-top box 1164 and/or video appliance 1136 can convert that information to analog information for display to a user. In certain embodiments, only one set of video information (i.e., one "channel") will be transmitted by NID 1100, and set top box 1164 and/or video appliance 1136 can submit configuration information to NID 1100 specifying which channel should be transmitted. In other embodiments, NID 1100 can transmit a plurality of channels via interface 1132*b,* and set-top box 1164 and/or video appliance 1136 can function to select for display one or more channels from those transmitted.

In many embodiments NID 1100 can be configured to operate in either fashion, and those skilled in the art will recognize that the functionality of the video appliances and/or set-top boxes at the customer premises, as well as the wiring topology of the customer premises, might render one mode more suitable than another. For instance, in a location with a plurality of video appliances and/or set-top boxes connected in bus fashion on a single medium, where each device is capable of selecting the desired channel for display, it may be more suitable to broadcast all of the available channels across the medium and allow each device to select from the broadcast. Conversely, in certain cases, for example, where each video device (i.e., set-top box and/or video appliance) is addressable and/or resides on a different transport medium and/or where one or more video devices are incapable of selecting from among a plurality of transmitted channels, it may be more appropriate to transmit a single channel to each device and/or transport medium, and allow the video devices (and/or separate remote control devices) to transmit requests for the desired channels back to NID 1100. In this way, for instance, a plurality of video appliances 1152*a,* 1152*b,* 1152*c* can be attached to NID 1100 via separate transport media, and processing system 1112 can send a discrete signal to each video appliance. Alternatively, a plurality of addressable video devices could be coupled to interfaces 1132*a,* 1132*b* (and/or any other interfaces), and a discrete video signal could be addressed to each attached video device and transmitted over a common transport media.

Those skilled in the art will appreciate, therefore, that certain embodiments, for instance those exemplified by FIG. 10, can provide a complete solution for providing both video and data communication to a customer premises. For instance, interface 1104, in addition to receiving video signals, could also receive downstream data transmissions, thus providing a downstream link between one or more telecommunication service providers and the customer premises. Interface 1110, then, could be used to provide an upstream link from the customer premises to the telecommunication provider(s), completing the connection between the service provider(s) and the customer premises.

Those skilled in the art will recognize that, in the past, such connections generally in the past generally have been implemented by connecting a telephone cable to a satellite set-top box, a technique with inherent limitations. In contrast, embodiments of the invention allow for any variety communication between the customer premises and the satellite provider, for billing and other purposes known to those skilled in the art, without requiring the satellite set-top boxes to have a telephone connection. For instance, by reference to FIG. 10, set top 1164 box can transmit any sort of video provisioning information to NID 1100, which can forward such information via interface 1102, interface 1110, and/or interface 1120 to the video service provider, allowing for a single connection to set top box 1164 to provide any necessary communication, including both video feeds and video provisioning information, greatly simplifying the wiring considerations at the customer premises. In this way, for example, NID 1100 could be used to allow provision of satellite video services without requiring the service provider to run a telephone line to the television location, significantly reducing the typical installation cost for satellite service.

As used herein, the term "video provision information" should be interpreted to include any information that is necessary to the provision of video services. Such information can be transmitted to and/or from the customer premises and can include, merely by way of example, both billing information (e.g., customer identification, information about services utilized, amounts due, and the like) and content request information (e.g., channel and/or subscription requests, pay per view and/or video on demand requests, and the like).

Further, embodiments of the invention can allow a telecommunication service provider to sell packaged services, with video (and, perhaps downstream data) transmitted to the home via satellite link, and upstream and/or downstream data delivered via, for instance, xDSL link. NIDs according to certain of these embodiments can also allow for the packaging of telephone services as well, and can facilitate the distribution of voice, data and/or video throughout a customer premises, in some instances using the existing wiring at the premises. Moreover, the modular design of many embodiments of NIDs allows for easy maintenance, configuration, and upgradeability, as discussed elsewhere in this disclosure. Those skilled in the art will recognize these and other advantages of certain embodiments.

In conclusion, the present invention provides novel demarcation devices, along with systems and methods for using the same. While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A network interface device located at a customer's premises, comprising:

an external interface that receives a plurality of telecommunication services via a fiber optic connection from a telecommunication service provider, wherein the services are received using Internet Protocol;

at least two distinct internal interfaces that distribute the plurality of telecommunication services to at least two distinct internal transport media; and a processor programmed to:

receive a control signal to modify the configuration of the external interface, the control signal initiated remotely by the telecommunication service provider;

receive combined signals comprising the telecommunication services from the external interface;

process the combined signals into separate signals representative of distinct telecommunication services; and map each of the separate signals to separate ones of the at least two distinct internal interfaces for distribution at the customer's premises via the internal transport media, wherein one of the at least two distinct internal interfaces is allocated at least a specified amount of bandwidth available through the fiber optic connection.

2. The network interface device of claim 1, wherein the external interface is further configured to direct signals relating to the telecommunication services to the telecommunication service provider via the fiber connection using Internet Protocol.

3. The network interface device of claim 1, wherein at least one of the at least two distinct internal interfaces is configured to receive signals relating to one of the telecommunication services from one of the internal transport media.

4. The network interface device of claim 1, wherein the processor is further programmed to:

receive separate signals from the at least two distinct internal transport media;

process the separate signals into a combined signal; and direct the combined signal to the external interface for distribution to the telecommunication service provider via the fiber optic connection using Internet Protocol.

5. The network interface device of claim 1, further comprising a signal integrator in communication with the at least two distinct internal interfaces, wherein the signal integrator is operable to integrate signals from the at least two distinct internal transport media into a combined information set.

6. The network interface device of claim 1, wherein at least one of the internal transport media comprises a coaxial cable.

7. The network interface device of claim 1, wherein at least one of the internal transport media comprises a twisted pair cable.

8. The network interface device of claim 7, wherein the twisted pair cable comprises existing telephone wiring at the customer premises.

9. The network interface device of claim 7, wherein the twisted pair cable comprises an Ethernet cable.

10. The network interface device of claim 1, wherein the fiber optic connection comprises a single-strand fiber optic connection capable of providing two-way communication.

11. The network interface device of claim 10, wherein the single-strand fiber optic connection uses either or both of wave-division multiplexing and time-division multiplexing.

12. The network interface device of claim 1, wherein the fiber optic connection comprises a multi-strand fiber optic connection.

13. The network interface device of claim 1, wherein the external interface comprises at least one multiplexer.

14. The network interface device of claim 1, wherein the telecommunication services comprise one or more selections from the group consisting of video, data, and voice.

15. The network interface device of claim 14, wherein different telecommunication services are transported in different frequency ranges.

16. The network interface device of claim 1, wherein the internal interfaces comprise a selection from the group consisting of IEEE 1394, RG6, RG59, wireless interface, 802.11, LMDS, Ethernet, twisted pair, category 3, category 4, category 5, category 6, category 7, and coaxial.

17. The network interface device of claim 1, wherein signals are transported on the internal transport media using a protocol selected from the group consisting of HPNA, HPNA+, and Home Plug.

18. The network interface device of claim 1, wherein the plurality of telecommunication services originate from a plurality of telecommunication service providers.

19. The network interface device of claim 1, the network interface device further comprising:

a customer area physically accessible to the customer; and a network area physically accessible only to the telecommunication service provider, wherein the processor is located in the network area.

20. The network interface device of claim 19, wherein the processor is further configured to automatically request updated configuration information.

21. A system for providing telecommunication services to a customer's premises, comprising:

an external transport medium comprising a fiber optic distribution system that uses Internet protocol to deliver the telecommunication services to the customer's premises; and a network interface device at the customer's premises, wherein the network interface device comprises:

an external interface that receives a plurality of telecommunication services via the external transport medium;

at least two distinct internal interfaces that distribute the plurality of telecommunication services to at least two distinct internal transport media; and a processor programmed to:

receive a control signal to modify the configuration of the external interface, the control signal initiated remotely by the telecommunication service provider;

receive combined signals comprising the telecommunication services from the external interface;

process the combined signals into separate signals representative of distinct telecommunication services; and map each of the separate signals to separate ones of the at least two distinct internal interfaces for distribution at the customer's premises via the internal transport media, wherein one of the at least two distinct internal interfaces is allocated at least a specified amount of downstream bandwidth available through the fiber optic connection.

22. The system of claim 21, wherein the external interface is further configured to direct signals relating to the telecommunication services to the telecommunication service provider via the fiber connection using Internet Protocol.

23. The system of claim 21, wherein at least one of the at least two distinct internal interfaces is configured to receive signals relating to one of the telecommunication services from one of the internal transport media.

24. The system of claim 21, wherein the processor is further programmed to:

receive separate signals from the at least two distinct internal transport media;

process the separate signals into a combined signal; and direct the combined signal to the external interface for distribution to the telecommunication service provider via the fiber optic connection using Internet Protocol, wherein one of the at least two distinct internal interfaces is allocated at least a specified amount of upstream bandwidth available through the fiber optic connection.

25. The system of claim 24, wherein one of the at least two distinct internal interfaces is allocated a limited portion of the bandwidth available through the combined signal.

26. The system of claim 21, further comprising a signal integrator in communication with the at least two distinct internal interfaces, wherein the signal integrator is operable to integrate signals from the at least two distinct internal transport media into a combined information set.

27. The system of claim 21, wherein at least one of the internal transport media comprises a coaxial cable.

28. The system of claim 21, wherein at least one of the internal transport media comprises a twisted pair cable.

29. The system of claim 28, wherein the twisted pair cable comprises existing telephone wiring at the customer premises.

30. The system of claim 28, wherein the twisted pair cable comprises an Ethernet cable.

31. The system of claim 21, wherein the fiber optic connection comprises a single-strand fiber optic connection capable of providing two-way communication.

32. The system of claim 31, wherein the single-strand fiber optic connection uses wave-division multiplexing and time-division multiplexing.

33. The system of claim 31, wherein different telecommunication services are transported in different frequency ranges.

34. The system of claim 21, wherein the fiber optic connection comprises a multi-strand fiber optic connection.

35. The system of claim 21, wherein the external interface comprises at least one multiplexer.

36. The system of claim 21, wherein the internal interfaces comprise a selection from the group consisting of IEEE 1394, RG6, RG59, wireless interface, 802.11, LMDS, Ethernet, twisted pair, category 3, category 4, category 5, category 6, category 7, and coaxial.

37. The system of claim 21, wherein signals are transported on the internal transport media using a protocol selected from the group consisting of HPNA, HPNA+, and Home Plug.

38. The system of claim 21, wherein the plurality of telecommunication services originate from a plurality of telecommunication service providers.

39. The system of claim 21, wherein the processor is programmed to provide one of a plurality of Quality of Service (QoS) levels for each of the at least two distinct internal transport media.

40. A method of delivering a plurality of telecommunication services to a customer's premises, comprising:
receiving combined signals comprising the telecommunication services from a telecommunication service provider via an external interface to a fiber optic connection, wherein the services are received using Internet Protocol;
processing the combined signals into separate signals representative of distinct telecommunication services; and
mapping each of the separate signals to separate ones of at least two distinct internal interfaces to at least two distinct internal transport media for distribution at the customer's premises via the internal transport media, wherein one of the at least two distinct internal interfaces is allocated at least a specified amount of downstream bandwidth available through the fiber optic connection.

41. The method of claim 40, wherein the external interface is further configured to direct signals relating to the telecommunication services to the telecommunication service provider via the fiber connection using Internet Protocol.

42. The method of claim 40, wherein at least one of the at least two distinct internal interfaces is configured to receive signals relating to one of the telecommunication services from one of the internal transport media.

43. The method of claim 40, further comprising:
receiving separate signals from the at least two distinct internal transport media;
processing the separate signals into a combined signal; and
directing the combined signal to the external interface for distribution to the telecommunication service provider via the fiber optic connection using Internet Protocol.

44. The method of claim 40, further comprising integrating signals from the at least two distinct internal transport media into a combined information set.

45. The method of claim 40, wherein at least one of the internal transport media comprises a coaxial cable.

46. The method of claim 40, wherein at least one of the internal transport media comprises a twisted pair cable.

47. The method of claim 46, wherein the twisted pair cable comprises existing telephone wiring at the customer premises.

48. The method of claim 46, wherein the twisted pair cable comprises an Ethernet cable.

49. The method of claim 40, wherein the fiber optic connection comprises a single-strand fiber optic connection capable of providing two-way communication.

50. The method of claim 40, wherein the fiber optic connection comprises a multi-strand fiber optic connection.

51. The method of claim 40, wherein the external interface comprises at least one multiplexer.

52. The method of claim 40, wherein the telecommunication services comprise one or more selections from the group consisting of video, data, and voice.

53. The method of claim 52, wherein different telecommunication services are transported in different frequency ranges.

54. The method of claim 40, wherein the plurality of telecommunication services originate from a plurality of telecommunication service providers.

* * * * *